United States Patent
Guim Bernat et al.

(10) Patent No.: US 12,271,248 B2
(45) Date of Patent: Apr. 8, 2025

(54) POWER-BASED ADAPTIVE HARDWARE RELIABILITY ON A DEVICE

(71) Applicant: Intel Corporation, Santa Clara, CA (US)

(72) Inventors: Francesc Guim Bernat, Barcelona (ES); Karthik Kumar, Chandler, AZ (US); Marcos E. Carranza, Portland, OR (US); Cesar Martinez-Spessot, Hillsboro, OR (US); Mustafa Hajeer, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 772 days.

(21) Appl. No.: 17/358,908

(22) Filed: Jun. 25, 2021

(65) Prior Publication Data
US 2021/0325954 A1     Oct. 21, 2021

(51) Int. Cl.
| | | |
|---|---|---|
| *G06F 1/3228* | (2019.01) | |
| *G06F 1/3206* | (2019.01) | |
| *G06F 1/3234* | (2019.01) | |
| *G06F 1/329* | (2019.01) | |
| *G06F 9/50* | (2006.01) | |

(52) U.S. Cl.
CPC .......... *G06F 1/3228* (2013.01); *G06F 1/3275* (2013.01); *G06F 1/329* (2013.01); *G06F 9/5061* (2013.01); *G06F 9/5094* (2013.01); *G06F 1/3206* (2013.01); *Y02D 10/00* (2018.01)

(58) Field of Classification Search
CPC .... G06F 1/3206; G06F 1/3228; G06F 1/3275; G06F 1/329; G06F 9/5061; G06F 9/5094; Y02D 10/00
See application file for complete search history.

(56) References Cited

U.S. PATENT DOCUMENTS

| | | | |
|---|---|---|---|
| 7,233,538 B1 | 6/2007 | Wu et al. | |
| 8,639,964 B2 * | 1/2014 | Berke | .......... G06F 11/004 |
| | | | 714/47.1 |

(Continued)

FOREIGN PATENT DOCUMENTS

CN    115525138    12/2022

OTHER PUBLICATIONS

"European Application Serial No. 22164665.6, Response filed Jun. 27, 2023 to Extended European Search Report mailed Aug. 30, 2022", 7 pgs.

(Continued)

*Primary Examiner* — Terrell S Johnson
(74) *Attorney, Agent, or Firm* — Schwegman Lundberg & Woessner, P.A.

(57) ABSTRACT

System and techniques for power-based adaptive hardware reliability on a device are described herein. A hardware platform is divided into multiple partitions. Here, each partition includes a hardware component with an adjustable reliability feature. The several partitions are placed into one of multiple reliability categories. A workload with a reliability requirement is obtained and executed on a partition in a reliability category that satisfies the reliability requirements. A change in operating parameters for the device is detected and the adjustable reliability feature for the partition is modified based on the change in the operating parameters of the device.

24 Claims, 15 Drawing Sheets

(56) References Cited

U.S. PATENT DOCUMENTS

| | | | |
|---|---|---|---|
| 2012/0272234 A1* | 10/2012 | Kaiser | G06F 11/3442 |
| | | | 718/1 |
| 2015/0212860 A1* | 7/2015 | Ali | G06F 9/5094 |
| | | | 718/104 |
| 2015/0370603 A1* | 12/2015 | Fuller | G06F 9/5011 |
| | | | 718/104 |
| 2018/0095802 A1 | 4/2018 | Nguyen et al. | |
| 2020/0233703 A1* | 7/2020 | Eleftheriadis | G06F 9/4893 |
| 2021/0325954 A1* | 10/2021 | Guim Bernat | G06F 1/3228 |
| 2022/0113785 A1* | 4/2022 | Lu | G06N 7/01 |

OTHER PUBLICATIONS

"European Application Serial No. 22164665.6, Communication Pursuant to Article 94(3) EPC mailed Aug. 8, 2023", 7 pgs.
"European Application Serial No. 22164665.6, Response filed Oct. 30, 2023 to Communication Pursuant to Article 94(3) EPC mailed Aug. 8, 2023", 15 pgs.
"European Application Serial No. 22164665.6, Extended European Search Report mailed Aug. 30, 2022", 9 pgs.
"European Application Serial No. 22164665.6, Communication Pursuant to Article 94(3) EPC mailed Jun. 25, 2024", 10 pgs.
"European Application Serial No. 22164665.6, Response filed Sep. 27, 24 to Communication Pursuant to Article 94(3) EPC mailed Jun. 25, 2024", 12 pgs.

* cited by examiner

POWER-BASED ADAPTIVE HARDWARE RELIABILITY ON A DEVICE

TECHNICAL FIELD

Embodiments described herein generally relate to computer power control and more specifically to power-based adaptive hardware reliability on a device.

BACKGROUND

Edge computing places computing resources close to consumers of services in order to, for example, meet ultra-low latency requirements of these services. Accordingly, compute servers are often situated in close physical proximity to data sources. For example, servers may be situated in cellular base stations. These kinds of operating environments are often unique because they are resource constrained environments. The resource constraints may include processing or storage limitations, as well as power. Often mains power (e.g., power provided by a commercial grid operator) is unavailable, and so battery or ambient power generation (e.g., wind or solar) power may be used. Ambient and battery power may fluctuate in time and the power use of applications running at the edge (e.g., demand for edge services) may also fluctuate in time.

Reliability, availability, and serviceability (RAS) features are hardware and software that increase the performance of a workload. Example RAS features may include memory error correction (e.g., error correction coding (ECC), memory patrolling, refresh rates, etc.), redundancy (of hardware, connections, etc.), among others. Generally, the greater the intervention or redundancy of a RAS feature, the fewer errors occur, and greater power is used.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
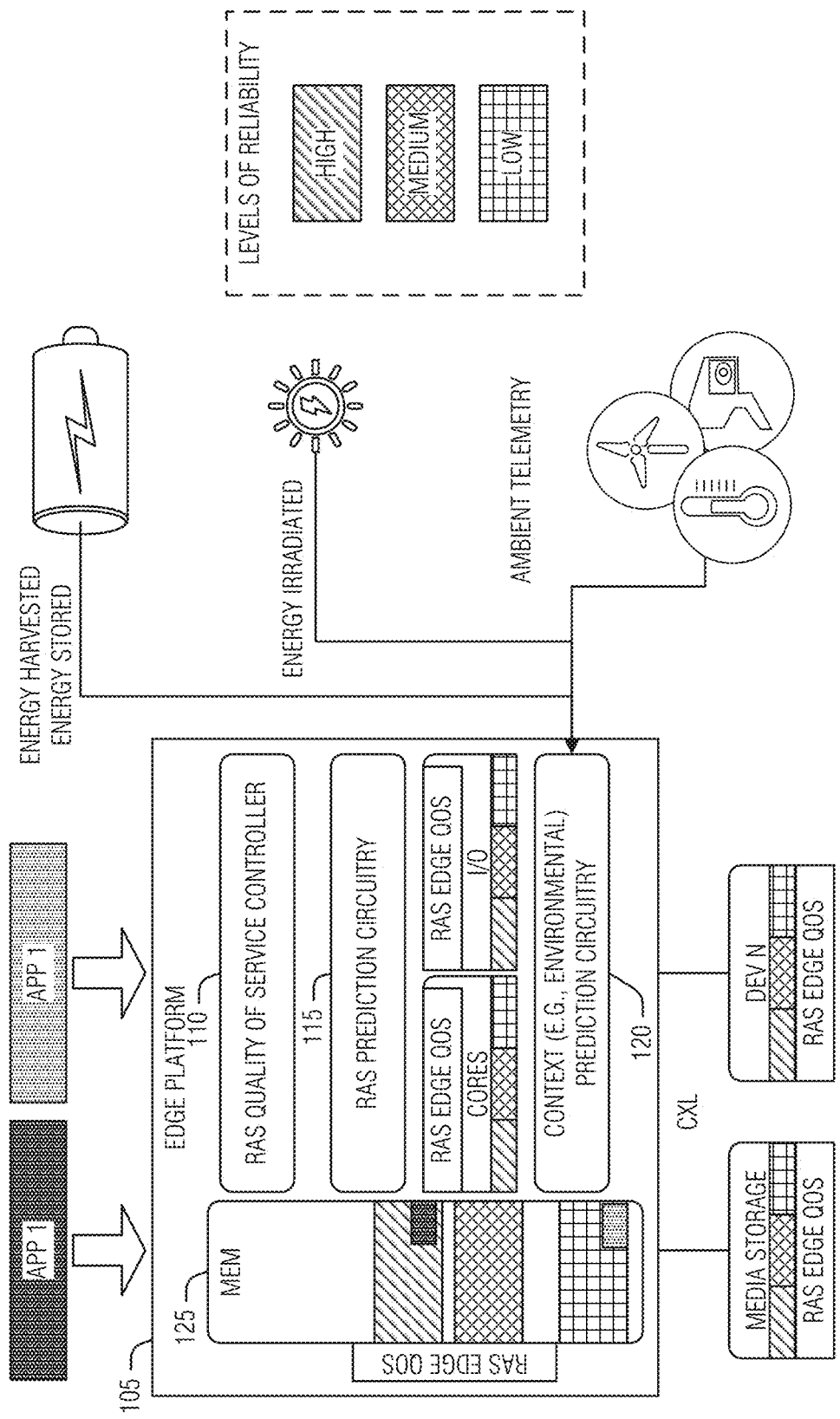
FIG. 1 is a block diagram of an example of an environment including a system for power-based adaptive hardware reliability on a device, according to an embodiment.

Edge computing generally involves unique constraints in terms of power management, operational efficiency, etc., over a data center deployment. Edge computing represents a dynamic operating environment. For example, during the day, it is often possible to use ambient power sources, scheduling operations around these opportunities to leverage excess ambient power. The following are considerations in these environments. Consider applications with different RAS requirements. Edge computing environments may host a wide variety of applications with different RAS requirements. For example, video analytics may have low RAS requirements while control loops from utility management services generally have high RAS requirements.

Reliability of hardware in these deployments varies. The reliability of the hardware in edge deployments may vary depending on the surrounding environment or context. Factors that affect hardware reliability may include the location, exposure to weather, or time of day, among others. A dynamic environment (e.g., high temperatures or physical movement due to wind) may affect the number of errors in a server and hence use a higher level of RAS features to address such changes.

Reliability, or a lack thereof, may be compensated for using hardware techniques (e.g., RAS features or configurable RAS features), usually at a cost (e.g., greater power consumption). For example, volatile memory systems typically exhibit lower reliability due to memory errors. To correct these errors, ECC or patrol scrubbing may be used to identify and fix a bit error, for example. However, if there are multiple bit errors within a given region, this becomes much harder to identify and fix. The number of bit errors is often a function of time between patrol scrubs. Thus, given enough time without doing patrol scrubbing/ECC, the probability of a second or third bit flip becomes higher and results in multiple bit errors. Further techniques may include usage of more ECC bits, aggressive correction algorithms, etc.

The "cost" for performing these corrective techniques is generally power consumption because since patrol scrubbing, increased refresh rates, or ECC consume additional bandwidth and resources. In edge deployments with power or resource constraints, increased reliability using these techniques may be challenging.

To address these issues, including meeting differing reliability requirements of applications and varying resource constraints on edge systems, the edge system is configured to divide its resources into RAS regions of varying reliability implemented through RAS feature selection. A combination of reliability prediction or estimation—e.g., based on ambient temperature, time of day, year, weather reports, usage patterns, etc.—with RAS feature selection or configuration (e.g., reliability controls) enable different reliability regions to be exposed to edge applications. Although many examples herein describe memory reliability and memory RAS features, the techniques are also applicable with any hardware with configurable RAS features, such as storage (e.g., non-volatile memory that is not fast enough to maintain system state such as FLASH devices, hard drives, storage class memory, etc.), redundant network interfaces, etc.

The designation, configuration, and allocation of RAS regions may include many factors. For example, to saving power consumption. RAS quality of service (QoS) requirements from the application—e.g., data from a video stream may tolerate one to two percent errors—may be considered along with an impact of thermals or ambient conditions and RAS feature requirements—e.g., refresh rate or patrol scrubbing—and power capping and management techniques that factor the application QoS requirements and the impact of the environmental context. To achieve these aspects, in an example, three architectural changes to standard edge computing platforms may be employed.

Edge resource RAS features may be expanded to partition resources into different regions or parts where RAS is managed independently. For example, with memory dual in-line memory modules (DIMMs), it is often possible to map multiple memory ranges into different memory ranks. Each RAS partition may have a different level RAS configuration, such as a lower memory refresh rate or lower memory bandwidth patrol scrubbing, mapped to different reliability QoS levels. For example, a high QoS with standard server RAS capabilities or medium QoS with a certain level of potential data corruption.

The edge platform may be expanded to include analytics to predict how ambient context, power harvesting, or available power may evolve over time. Thus, depending on the expected amount of power available, the edge platform may increase the RAS features mapped to medium or low RAS QoS classes—with multiple classes or levels being able to be defined—to address increased error rates under high temperatures when the sun is shining, for example. The predictions of the effectiveness of allocation changes may be provided to the software stack to better manage data or compute allocations. To this end, in an example, the edge platform is configured to exposes new interfaces to the software stack in order to access this information. Additional details and examples are provided below.

FIG. 1 is a block diagram of an example of an environment including a system for power-based adaptive hardware reliability on a device, according to an embodiment. As illustrated, the edge platform 105 includes hardware with adjustable RAS features (RAS hardware 125), such as the memory, processing cores, input-output (I/O), media storage, or other attached devices (DEV N). In an example, the RAS hardware may be partitioned such that different RAS features may be employed on different partitions of the RAS hardware 125.

The edge platform 105 also includes a RAS QoS controller 110. RAS prediction circuitry 115, and context prediction circuitry 120. The context prediction circuitry 120 is configured to predict or estimate future conditions of temperature, vibration, contamination (e.g., moisture, dust, etc.) of the edge platform 105. The RAS prediction circuitry 115 is configured to determine the effect of a RAS QoS level or class given a set of RAS features enabled on RAS hardware 125 and the output of the context prediction circuitry 120. The RAS controller 110 is configured to define the RAS partitions, configured RAS features of the RAS partitions to meet RAS QoS classes, and expose the RAS QoS classes to applications. Generally, the goal is to maintain the lowest RAS features while satisfying the QoS expected by applications to function properly.

Accordingly, the RAS QoS controller 110 is configured to divide the hardware platform (e.g., RAS hardware 125) into several partitions. Again, a partition includes a hardware component (such as a memory bank or rank) with an adjustable reliability feature. In an example, the several partitions are placed into one of multiple reliability categories. These reliability categories (e.g., RAS QoS levels or classes) represent a certain level of reliability (e.g., percent of bit errors in memory reads) that may be matched against reliability requirements of applications.

In an example, the RAS QoS controller 110 is configured to obtain (e.g., retrieve or receive) a workload with a reliability requirement. The reliability requirement may specify a tolerance for bit errors, latency, or other aspects or errors of processing for the application. In an example, the reliability requirement is obtained by profiling the workload. In an example, the reliability requirement is obtained by metadata distributed with the workload. Profiling enables reliability requirements in environments where, for example, developers have not yet tested the workload in order to provide the reliability requirements. Further, while provided reliability requirements may be conservative, profile may reveal that the reliability requirements are too constrictive and thus inefficient. However, it may be difficult to determine whether a greater tolerance for error is actually acceptable by automated profiling.

The edge platform 105 is configured to execute the workload on a partition of the several partitions in a reliability category that satisfies the reliability requirements. Here, the RAS hardware 125 partition with the lowest cost (e.g., fewest RAS features enabled) that meets the reliability requirements is selected. This ensures that less power is consumed overall while maintaining workload QoS expectations.

The context prediction circuitry 120 is configured to detect or predict a change in operating parameters for the edge platform 105. In an example, the operating parameters subject to the change include power. In an example, the change is in a reduction of power. Here, the reduction in power is due to battery resources draining, or the lack of ambient power generation. However, there may be circumstances when mains power is interrupted, such as through rolling black- or brown outs, or even scheduled interruptions due to high costs of power at certain times of day or year (e.g., summer months during the day). In an example, the change is a predicted reduction in power. In an example, the predicted reduction in power is based on historical power supply and a current context. In an example, the current context includes at least one of time, temperature, or weather. Power increases, for example, due to a solar panel and a prediction of a sunny day, are also a change in operation parameters of the edge platform 105.

Power sources that may be available include mains power (e.g., from a commercial grid operator), which may be sourced from nuclear, coal, natural gas, solar, wind, geothermal, grid-level battery, tide generators, or hydroelectric among others; ambient power at the device 105, such as solar (e.g., from a solar panel on the device 105), wind, or geothermal; and temporary power, such as batteries, fuel cells, or generators (e.g., a petrol or diesel generator) of the device 105. Predictive techniques of power availability may vary between these different power sources. For example, base-line power sources—such as nuclear or hydroelectric—generally cannot change output based on demand. Thus, predicting power availability may include predicting grid demand, such as a heatwave likely to tax the power grid with air conditioning use. Environmentally dependent power generation, such as wind or solar, may involve ascertaining outputs for wind velocity predictions, or cloud cover, applied to a statistical analysis of the historical data to ascertain the average power output under these conditions. Temporary power source power availability predictions may involve fuel capacity and efficiency, or battery performance (e.g., degradation) to predict how much power will be available from these sources.

In an example, the operating parameters subject to the change include temperature. In an example, the change is in an increase, or a predicted increase, in temperature. In an example, the predicted increase in temperature is based on temperature measurements and a current context. In an example, the current context includes at least one of time, temperature, or weather. Temperature increases generally lead to more errors. Thus, RAS features usually need to be increased on the RAS hardware 125 in order to maintain a same reliability category when the temperature increases. Other factors that may exhibit this behavior include contamination or vibration. This adjustment is generally handled by the RAS prediction circuitry 115.

In an example, detecting the change in operating parameters for the device includes monitoring errors during execution of the workload and determining that the errors are beyond a threshold for the reliability category. Here, the RAS edge QoS blocks at the various RAS hardware 125 operate to signal error rates outside of normal operating parameters. This additional insight enables the RAS prediction circuitry 115 to adjust reliability category requirements (e.g., what RAS features are necessary for the RAS hardware 125 to meet a particular reliability category) in a dynamic manner.

The RAS QoS controller 110 is configured to adjust adjustable reliability feature for the partition based on the change in the operating parameters of the device. In an example, where the operating parameter changed is a reduction in power, modifying the adjustable parameter includes reducing power consumption by disabling or reducing an intervention rate of the adjustable parameter. In an example, the adjustable parameter is a memory refresh rate or patrol scrubbing operation. In these examples, reliability is reduced in order to conserve power.

In an example, where the operating parameter changed is an increase in temperature, modifying the adjustable parameter includes increasing reliability by enabling or increasing an intervention rate of the adjustable parameter. In an example, the adjustable parameter is a memory refresh rate or patrol scrubbing operation. Here, power is consumed to offset the probable decrease in reliability due to the temperature increase.

In an example, the edge platform 110 is configured to move the partition to a second reliability category in response to modifying the adjustable parameter. Thus, if reliability is reduced to conserve power, the reliability category of the partition is changed to reflect this to workloads. In an example, the workload is moved to a second partition that has the reliability category expected by the workload.

Figure 2:
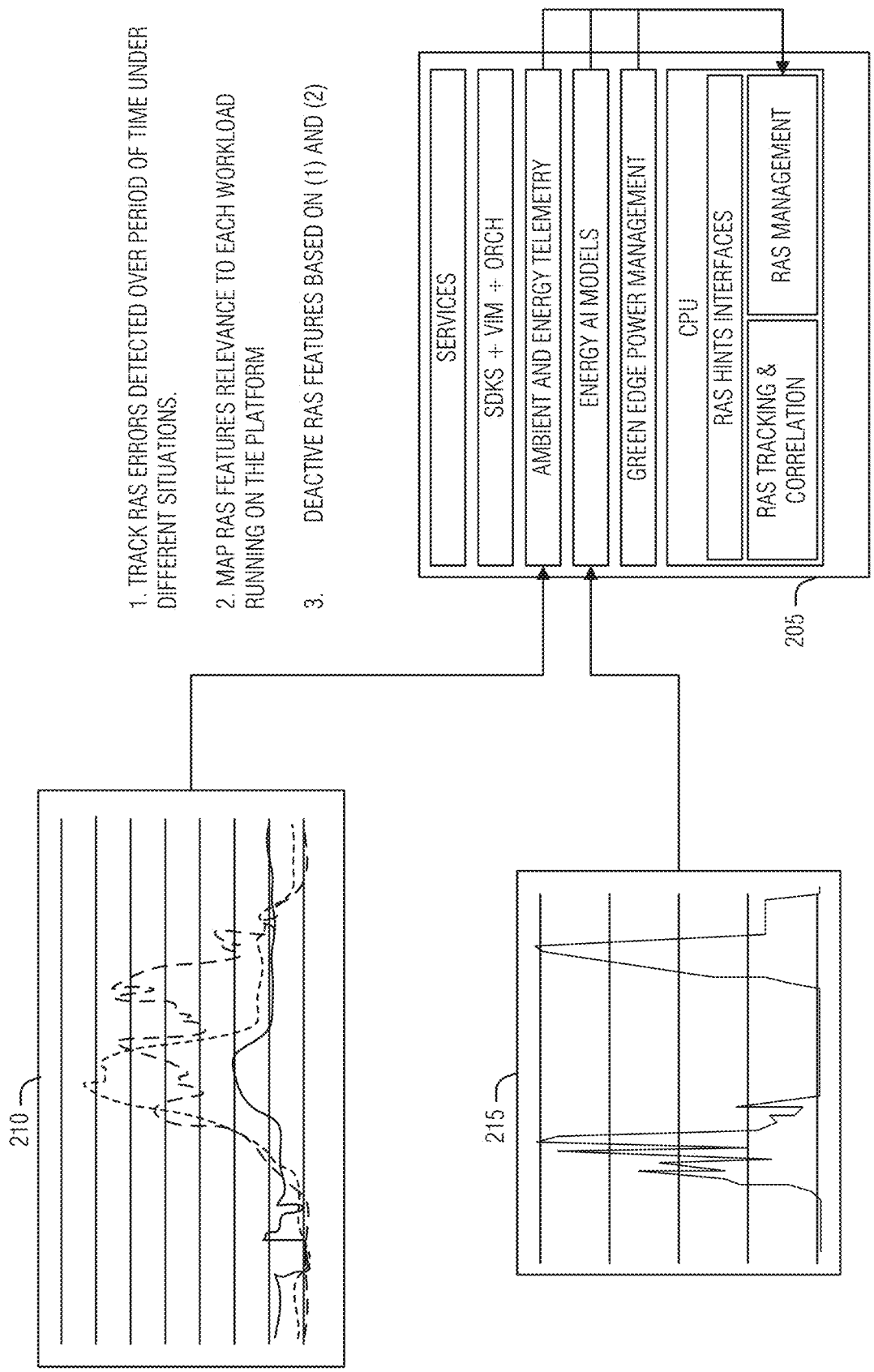
FIG. 2 illustrates an example of an architecture for power-based adaptive hardware reliability on a device, according to an embodiment.

FIG. 2 illustrates an example of an architecture 205 for power-based adaptive hardware reliability on a device, according to an embodiment. The architecture 205 includes hardware or software components that monitor (e.g., sensor metrics 210) and correlate (e.g., via learning model 215) how RAS features are being asserted (e.g., to detect or correct errors) over time with respect to the ambient conditions (e.g., environmental context) and the types of workloads being executed, for example, ascertained by workloads providing a hint of the type of workload, through analytics, content delivery etc.

The architecture 205 exposes an interface that enables the workloads being deployed into the architecture 205 to select the type of workload—such as through a listing or templates that map workload types or features to RAS features—or the list of RAS features that are relevant to the workload and at what level (e.g., category), such as critical, not critical, no relevance, etc.

The architecture 205 includes circuitry that considers workload reliability and environmental context to determine what RAS features may be completely deactivated or that may be deactivated but are tracked from time-to-time.

For the features that may not be critical but may be good to catch errors when they happen, the circuitry may activate from time-to-time those features and track whether they are being asserted (e.g., used) or not. Depending on the level of relevance of those features to the services or applications running in the architecture 205, the circuitry may determine to re-activate them if errors start increasing again.

An example of a relevant RAS feature is a memory patrol scrubber. When a specific memory area is being read by cores, or other active systems, in normal operations, the patrol scrubber will scrub to check for potential errors. However, depending on the nature of the workload and likelihood of errors, the patrol scrubber activity (e.g., frequency of action) may be increased or reduced dynamically. Reductions in patrol scrubber activity may result in substantial power savings. Other examples may include be peripheral component interconnect (PCI) express (PCIE) link degradation for error management and degraded mode of operation.

Figure 3:
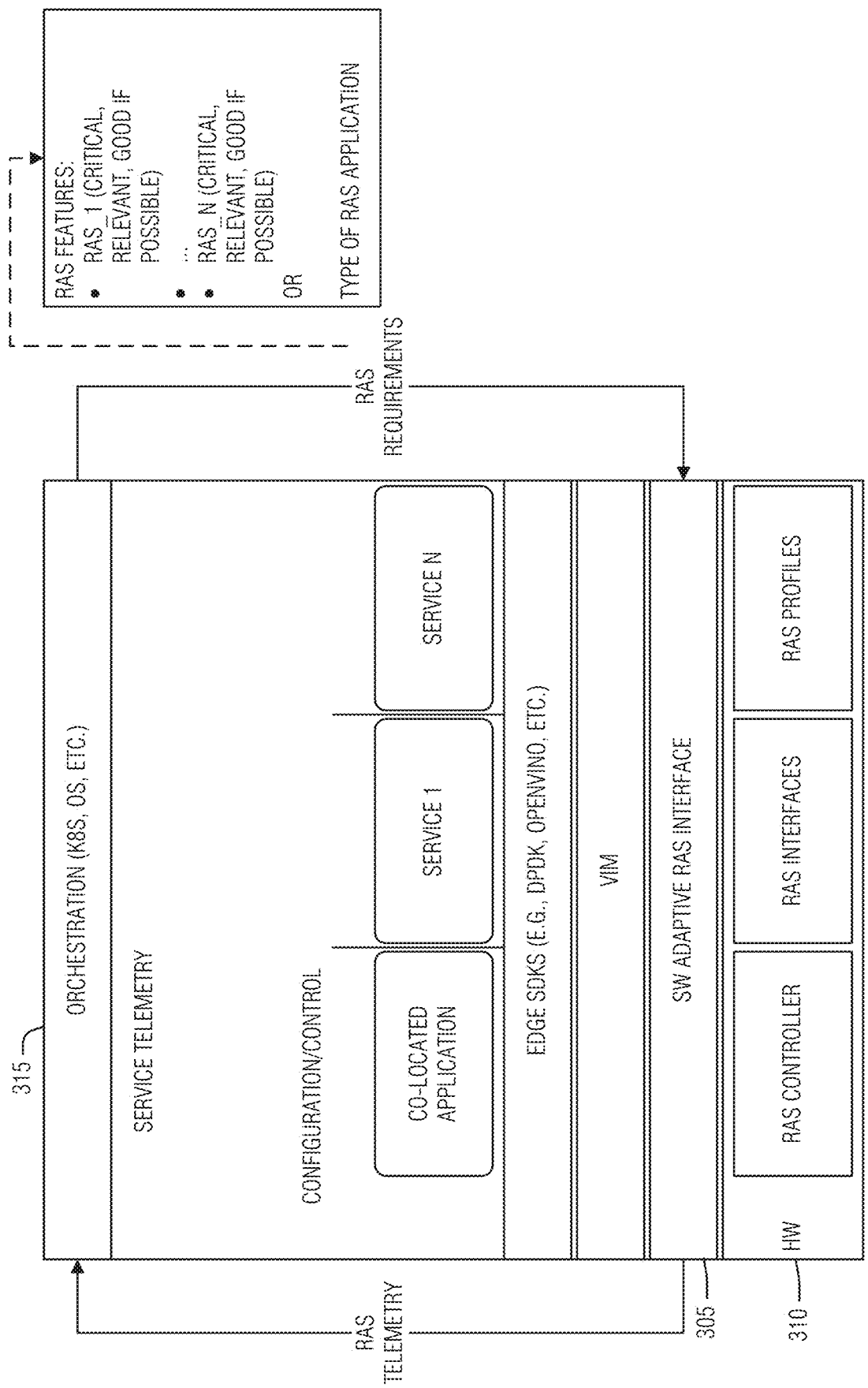
FIG. 3 illustrates an example of component interaction in a system for power-based adaptive hardware reliability on a device, according to an embodiment.

FIG. 3 illustrates an example of component interaction in a system for power-based adaptive hardware reliability on a device, according to an embodiment. Generally, RAS requirements are specified for hardware 310 to make efficient decisions in resource constrained environments. The illustrated interactions enable workloads to provide RAS requirements (e.g., via an orchestrator 315) and the RAS controller to enable or disable them based on the resources that they are being used.

As illustrated, an adaptive RAS interface 305 is used to enable the software stack (e.g., the orchestrator 315) to specify specific RAS requirements for a particular workload and which resources that are being used for that workload. As noted above, the RAS interface 305 may be configured to provide a detailed list of requirements that match a performance assured service ID for the application and a list of resources for the application. In an example, each resource includes a list of RAS features that are relevant for that application and resource, and the level of relevance for that feature, such as critical, high, relevant, medium, nice to have, low, not relevant, etc.

The RAS interface 305 may alternatively, or in addition, provide a profile type to which the workload may be matched (e.g., by itself or by the orchestrator 315). Here, the RAS interface 305 may include a set of profiles of applications with certain RAS features based on the application type. In this case, the manufacturer may define a list of predefined configurations provided with the architecture.

RAS functionalities may also be tracked based on the current status of workload deployments. Here, a RAS feature may be correlated to a set of sensitivities mapped to environmental variables—such as temperature, vibration etc.—that are used to determine whether or not those features are required or useful. For the features that are not critical but relevant, the features may be tracked on a regular basis (e.g., during some intervals but not all the time) to provide data for analytics to determine if the features need to be activated or not.

In summary, given a pool of resources with different RAS sensitivities, features, or configurations, based on telemetry, workloads are matched to RAS regions to reduce power consumption while maintaining acceptable workload performance. Different portions of pools may be dynamically adjusted based on telemetry. Then workloads may use the RAS interface 305 to select the appropriate RAS regions in the hardware 310.

Figure 4:
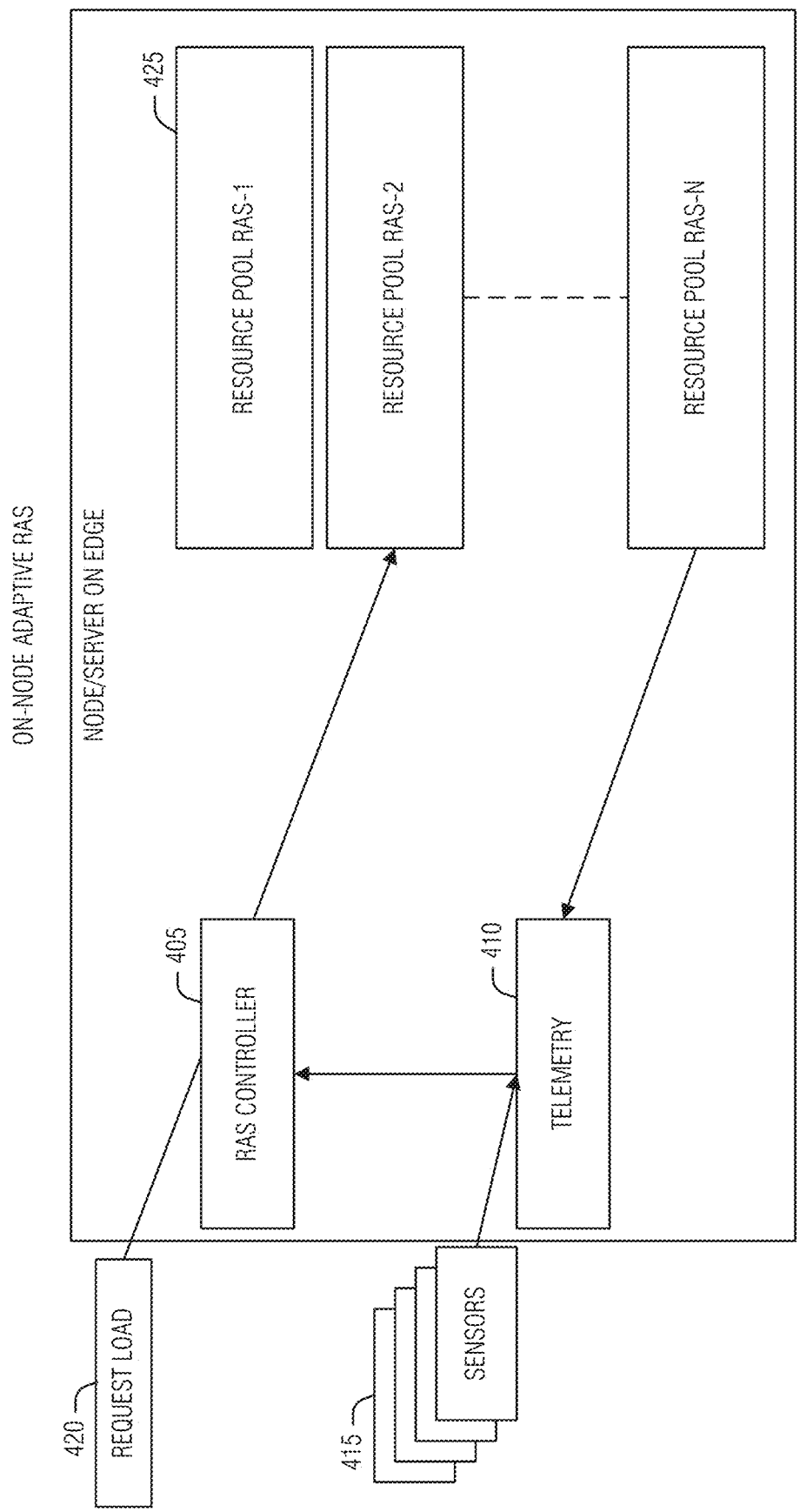
FIG. 4 illustrates an example of maintaining different RAS pools on a node, according to an embodiment.

FIG. 4 illustrates an example of maintaining different RAS pools 425 on a node, according to an embodiment. Maintaining resource pools 425 within a memory pool with different RAS capabilities may be done based on telemetry circuitry 410 and RAS controller 405. For example, Resource pool RAS-1 may have all ECC bits aggressively used for memory recovery with no ECC bits used for directory coherence. This results in a high recoverability, high consumption (e.g., due to snoop bandwidth use) pool. In contrast, resources pool RAS-2 may be for data that does not need to be recovered if memory errors occur. Here minimal use of ECC bits for error recoverability may be employed in favor of using metadata bits for directory coherence, or for storing tags in a cached hierarchy. In an example, the RAS controller 405 may assign a workload 420 to a pool 425. The RAS controller 405 may also adjust the pools 425 based on usage or telemetry from the telemetry circuitry 410 processing data from the sensors 415.

Figure 5:
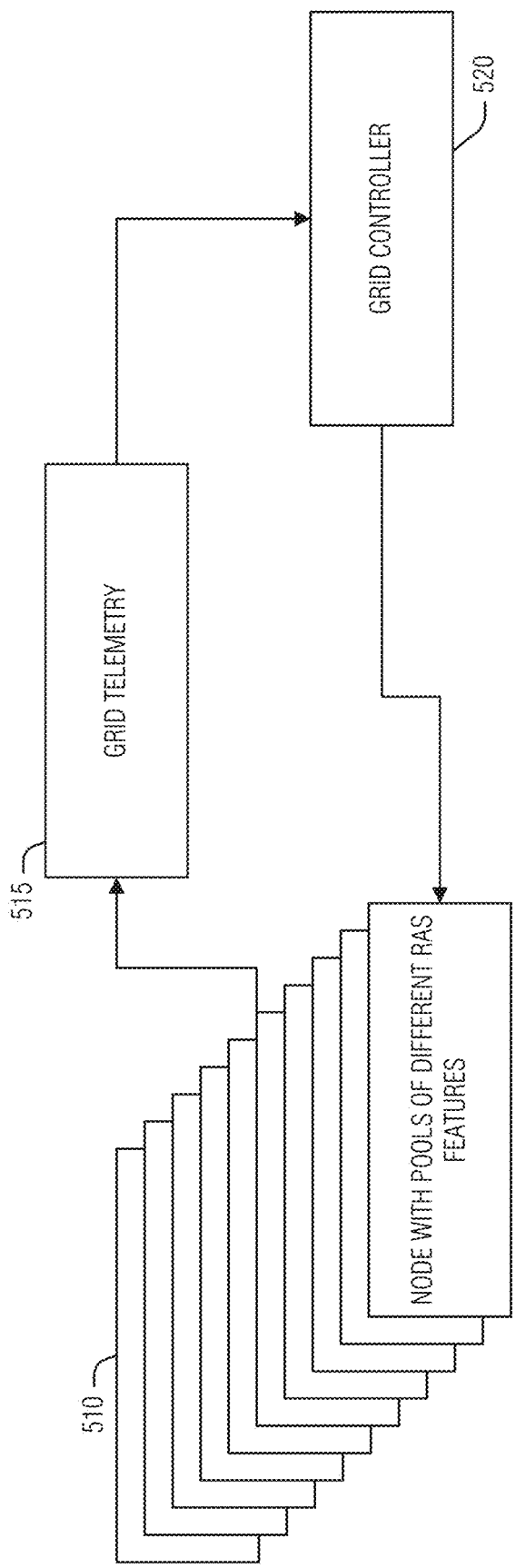
FIG. 5 illustrates an example of maintaining different RAS pools on different nodes, according to an embodiment.

FIG. 5 illustrates an example of maintaining different RAS pools on different nodes, according to an embodiment. Here, data is collected from the nodes 510 by the group telemetry device 515. The telemetry may then be used by the group controller 520. This represents a larger, group level. RAS management infrastructure that enables more holistic determination to be made at the grid or data center level as wells as within each node or memory pool. Here, the group may be a grid, such as a power grid, telecommunications grid, etc. of related nodes.

Figure 6:
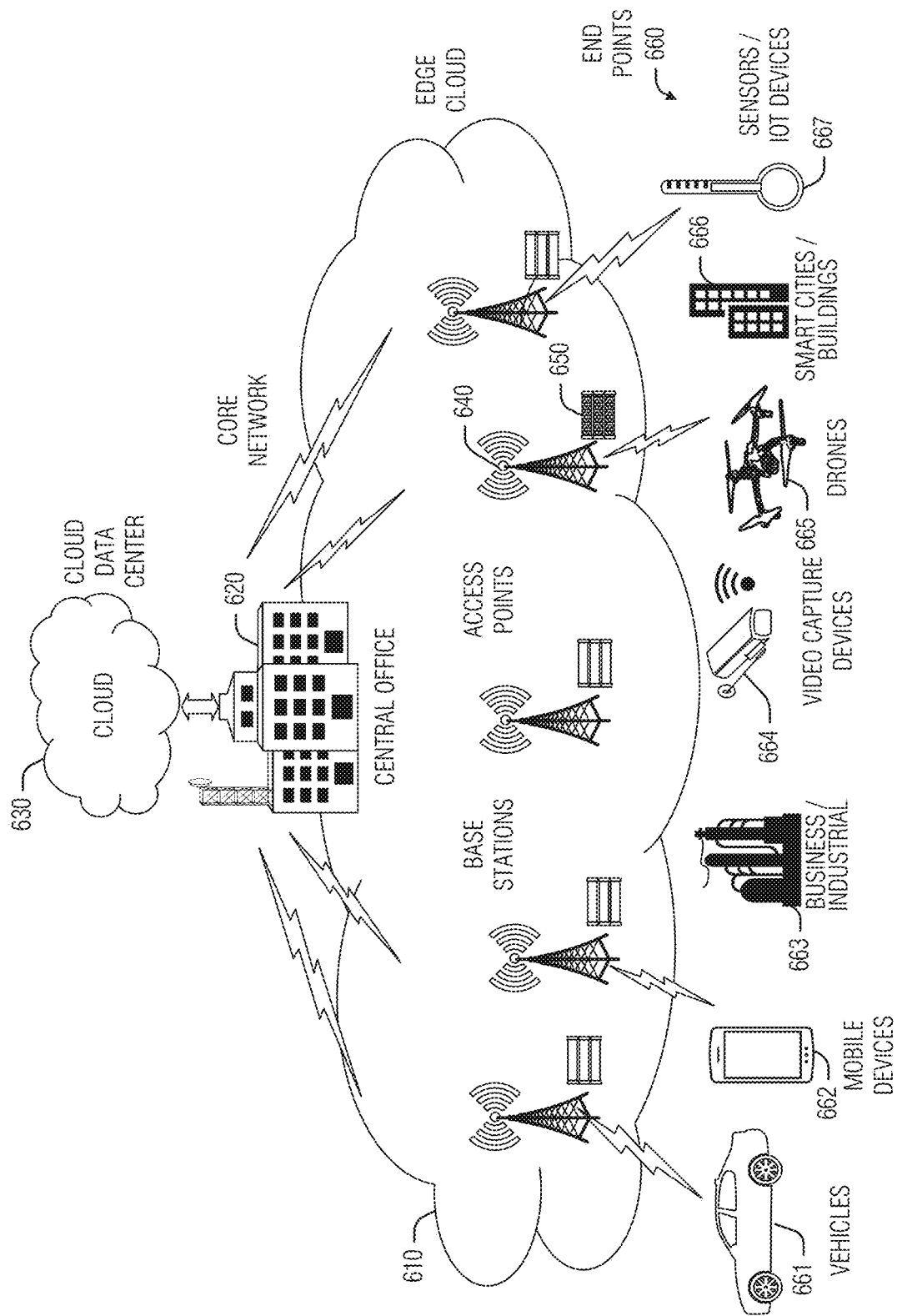
FIG. 6 illustrates an overview of an edge cloud configuration for edge computing.

FIG. 6 is a block diagram showing an overview of a configuration for edge computing, which includes a layer of processing referred to in many of the following examples as an "edge cloud". As shown, the edge cloud 610 is co-located at an edge location, such as an access point or base station 640, a local processing hub 650, or a central office 620, and thus may include multiple entities, devices, and equipment instances. The edge cloud 610 is located much closer to the endpoint (consumer and producer) data sources 660 (e.g., autonomous vehicles 661, user equipment 662, business and industrial equipment 663, video capture devices 664, drones 665, smart cities and building devices 666, sensors and IoT devices 667, etc.) than the cloud data center 630. Compute, memory, and storage resources which are offered at the edges in the edge cloud 610 are critical to providing ultra-low latency response times for services and functions used by the endpoint data sources 660 as well as reduce network backhaul traffic from the edge cloud 610 toward cloud data center 630 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge". "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 7:
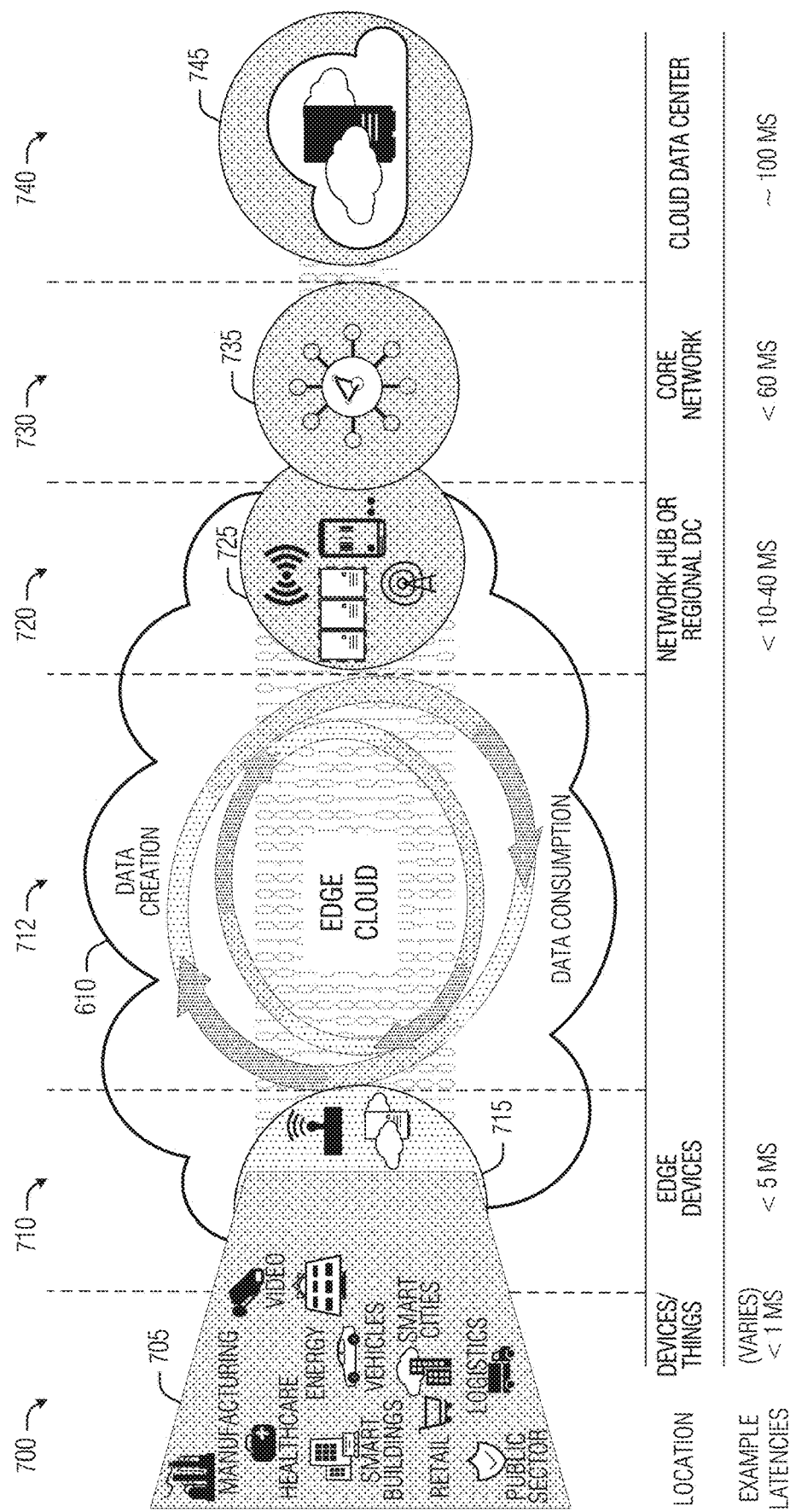
FIG. 7 illustrates operational layers among endpoints, an edge cloud, and cloud computing environments.

FIG. 7 illustrates operational layers among endpoints, an edge cloud, and cloud computing environments. Specifically, FIG. 7 depicts examples of computational use cases 705, utilizing the edge cloud 610 among multiple illustrative layers of network computing. The layers begin at an endpoint (devices and things) layer 700, which accesses the edge cloud 610 to conduct data creation, analysis, and data consumption activities. The edge cloud 610 may span multiple network layers, such as an edge devices layer 710 having gateways, on-premise servers, or network equipment (nodes 715) located in physically proximate edge systems; a network access layer 720, encompassing base stations, radio processing units, network hubs, regional data centers (DC), or local network equipment (equipment 725); and any equipment, devices, or nodes located therebetween (in layer 712, not illustrated in detail). The network communications within the edge cloud 610 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 700, under 5 ms at the edge devices layer 710, to even between 10 to 40 ms when communicating with nodes at the network access layer 720. Beyond the edge cloud 610 are core network 730 and cloud data center 740 layers, each with increasing latency (e.g., between 50-60 ms at the core network layer 730, to 100 or more ms at the cloud data center layer). As a result, operations at a core network data center 735 or a cloud data center 745, with latencies of at least 50 to 100 ms or more, will not be able to accomplish many time-critical functions of the use cases 705. Each of these latency values are provided for purposes of illustration and contrast; it will be understood that the use of other access network mediums and technologies may further reduce the latencies. In some examples, respective portions of the network may be categorized as "close edge", "local edge", "near edge". "middle edge", or "far edge" layers, relative to a network source and destination. For instance, from the perspective of the core network data center 735 or a cloud data center 745, a central office or content data network may be considered as being located within a "near edge" layer ("near" to the cloud, having high latency values when communicating with the devices and endpoints of the use cases 705), whereas an access point, base station, on-premise server, or network gateway may be considered as located within a "far edge" layer ("far" from the cloud, having low latency values when communicating with the devices and endpoints of the use cases 705). It will be understood that other categorizations of a particular network layer as constituting a "close", "local", "near", "middle", or "far" edge may be based on latency, distance, number of network hops, or other measurable characteristics, as measured from a source in any of the network layers 700-740.

The various use cases 705 may access resources under usage pressure from incoming streams, due to multiple services utilizing the edge cloud. To achieve results with low latency, the services executed within the edge cloud 610 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 610 may provide the ability to serve and respond to multiple applications of the use cases 705 (e.g., object tracking, video surveillance, connected cars, etc.) in real-time or near real-time, and meet ultra-low latency requirements for these multiple applications. These advantages enable a whole new class of applications (Virtual Network Functions (VNFs). Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permissioned access (e.g., when housed in a third-party location). Such issues are magnified in the edge cloud 610 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 610 (network layers 700-740), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 610.

As such, the edge cloud 610 is formed from network components and functional features operated by and within edge gateway nodes, edge aggregation nodes, or other edge compute nodes among network layers 710-730. The edge cloud 610 thus may be embodied as any type of network that provides edge computing or storage resources which are proximately located to radio access network (RAN) capable endpoint devices (e.g., mobile computing devices, IoT devices, smart devices, etc.), which are discussed herein. In other words, the edge cloud 610 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage or compute capabilities. Other types and forms of network access (e.g., Wi-Fi, long-range wireless, wired networks including optical networks) may also be utilized in place of or in combination with such 3GPP carrier networks.

The network components of the edge cloud 610 may be servers, multi-tenant servers, appliance computing devices, or any other type of computing devices. For example, the edge cloud 610 may include an appliance computing device that is a self-contained electronic device including a housing, a chassis, a case or a shell. In some circumstances, the housing may be dimensioned for portability such that it can be carried by a human or shipped. Example housings may include materials that form one or more exterior surfaces that partially or fully protect contents of the appliance, in which protection may include weather protection, hazardous environment protection (e.g., EMI, vibration, extreme temperatures), or enable submergibility. Example housings may include power circuitry to provide power for stationary or portable implementations, such as AC power inputs. DC power inputs. AC/DC or DC/AC converter(s), power regulators, transformers, charging circuitry, batteries, wired inputs or wireless power inputs. Example housings or surfaces thereof may include or connect to mounting hardware to enable attachment to structures such as buildings, telecommunication structures (e.g., poles, antenna structures, etc.) or racks (e.g., server racks, blade mounts, etc.). Example housings or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface or mounted to the surface of the appliance. Example housings or surfaces thereof may support mechanical connectivity, such as propulsion hardware (e.g., wheels, propellers, etc.) or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein or attached thereto. Output devices may include displays, touchscreens, lights. LEDs, speakers, I/O ports (e.g., USB), etc. In some circumstances, edge devices are devices presented in the network for a specific purpose (e.g., a traffic light), but may have processing or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 11B. The edge cloud 610 may also include one or more servers or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications or other software, code or scripts may execute while being isolated from one or more other applications, software, code or scripts.

Figure 8:
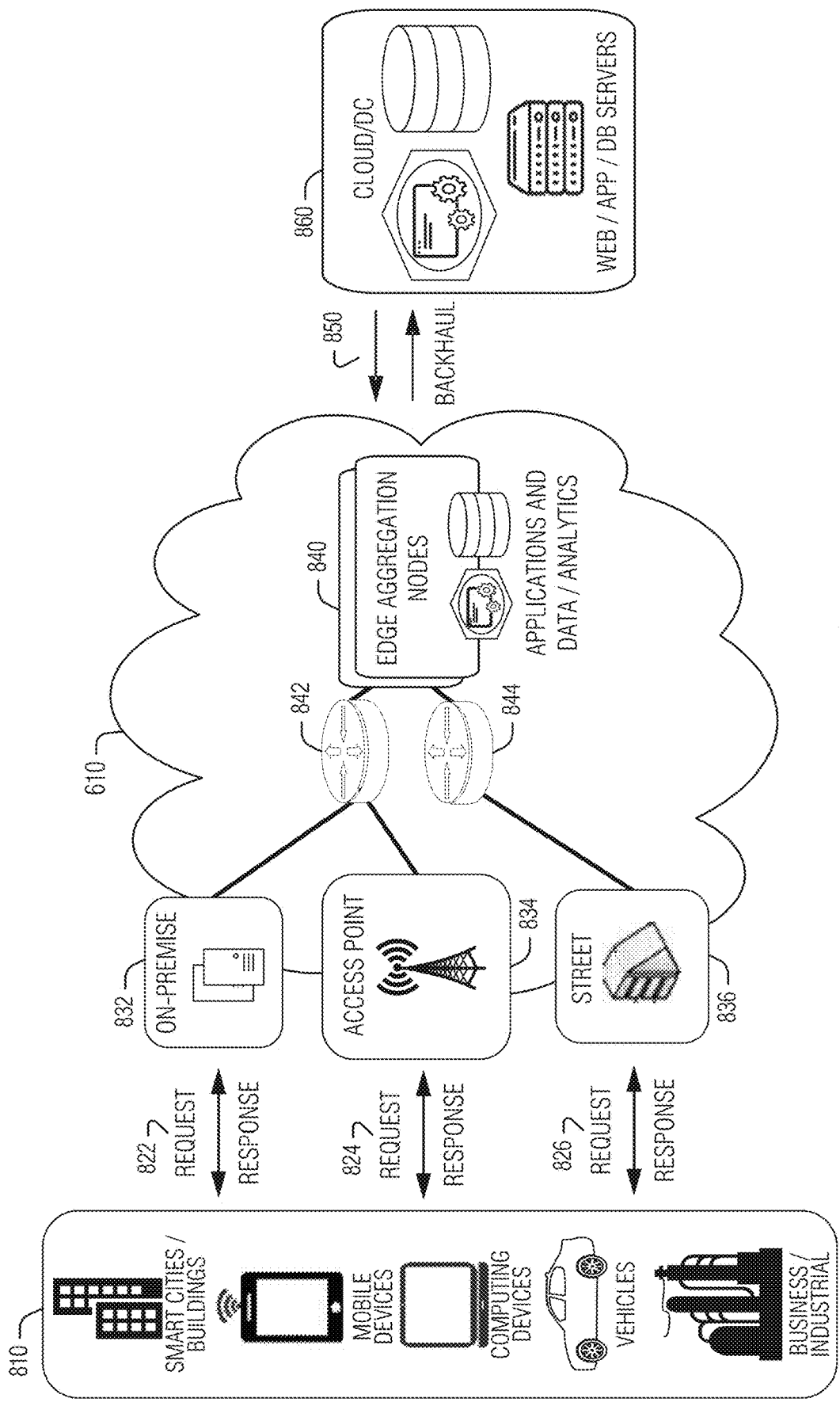
FIG. 8 illustrates an example approach for networking and services in an edge computing system.

In FIG. 8, various client endpoints 810 (in the form of mobile devices, computers, autonomous vehicles, business computing equipment, industrial processing equipment) exchange requests and responses that are specific to the type of endpoint network aggregation. For instance, client endpoints 810 may obtain network access via a wired broadband network, by exchanging requests and responses 822 through an on-premise network system 832. Some client endpoints 810, such as mobile computing devices, may obtain network access via a wireless broadband network, by exchanging requests and responses 824 through an access point (e.g., cellular network tower) 834. Some client endpoints 810, such as autonomous vehicles may obtain network access for requests and responses 826 via a wireless vehicular network through a street-located network system 836. However, regardless of the type of network access, the TSP may deploy aggregation points 842, 844 within the edge cloud 610 to aggregate traffic and requests. Thus, within the edge cloud 610, the TSP may deploy various compute and storage resources, such as at edge aggregation nodes 840, to provide requested content. The edge aggregation nodes 840 and other systems of the edge cloud 610 are connected to a cloud or data center 860, which uses a backhaul network 850 to fulfill higher-latency requests from a cloud/data center for websites, applications, database servers, etc. Additional or consolidated instances of the edge aggregation nodes 840 and the aggregation points 842, 844, including those deployed on a single server framework, may also be present within the edge cloud 610 or other areas of the TSP infrastructure.

Figure 9:
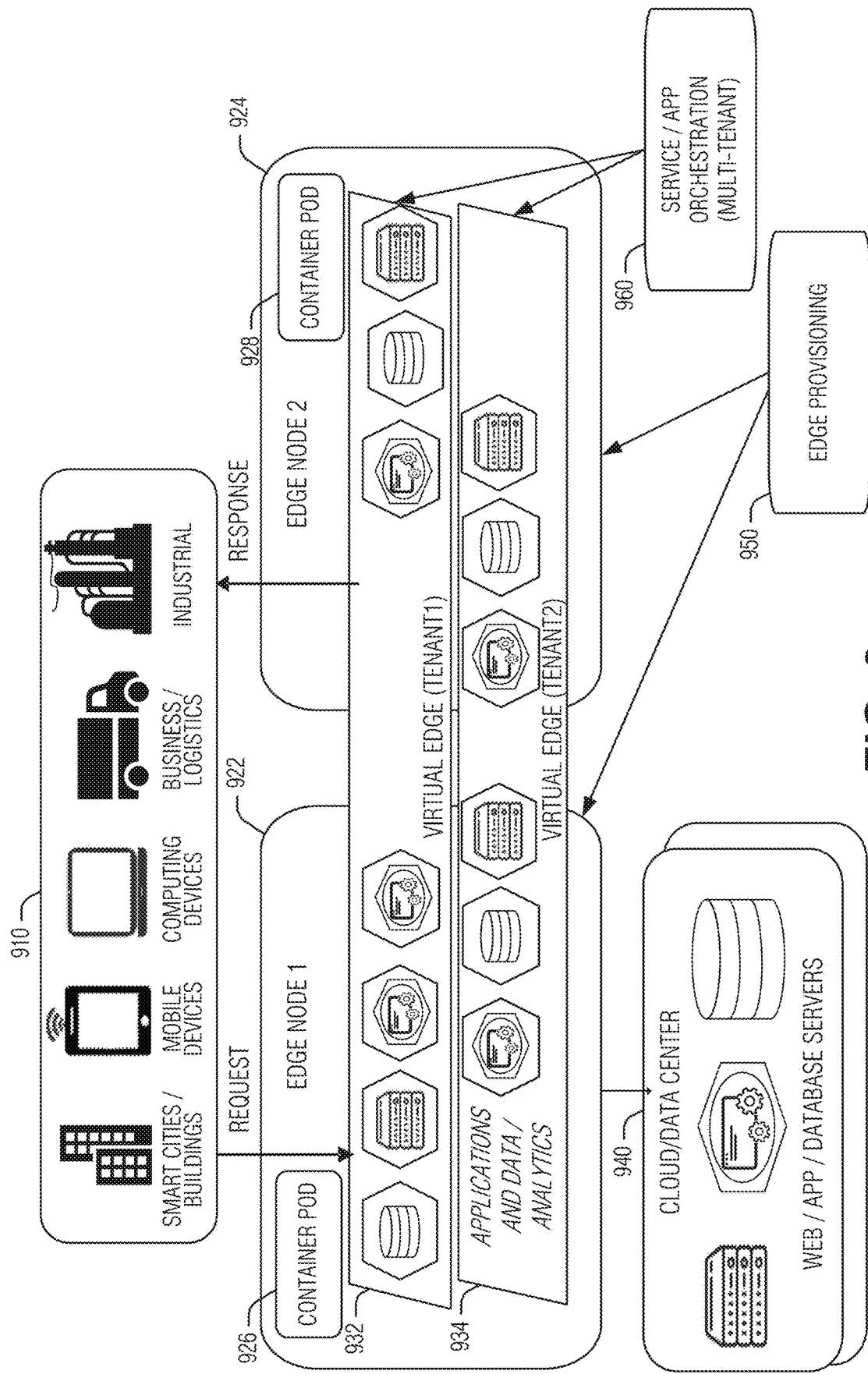
FIG. 9 illustrates deployment of a virtual edge configuration in an edge computing system operated among multiple edge nodes and multiple tenants.

FIG. 9 illustrates deployment and orchestration for virtualized and container-based edge configurations across an edge computing system operated among multiple edge nodes and multiple tenants (e.g., users, providers) which use such edge nodes. Specifically. FIG. 9 depicts coordination of a first edge node 922 and a second edge node 924 in an edge computing system, to fulfill requests and responses for various client endpoints 910 (e.g., smart cities/building systems, mobile devices, computing devices, business/logistics systems, industrial systems, etc.), which access various virtual edge instances. Here, the virtual edge instances 932, 934 provide edge compute capabilities and processing in an edge cloud, with access to a cloud/data center 940 for higher-latency requests for websites, applications, database servers, etc. However, the edge cloud enables coordination of processing among multiple edge nodes for multiple tenants or entities.

In the example of FIG. 9, these virtual edge instances include: a first virtual edge 932, offered to a first tenant (Tenant 1), which offers a first combination of edge storage, computing, and services; and a second virtual edge 934, offering a second combination of edge storage, computing, and services. The virtual edge instances 932, 934 are distributed among the edge nodes 922, 924, and may include scenarios in which a request and response are fulfilled from the same or different edge nodes. The configuration of the edge nodes 922, 924 to operate in a distributed yet coordinated fashion occurs based on edge provisioning functions 950. The functionality of the edge nodes 922, 924 to provide coordinated operation for applications and services, among multiple tenants, occurs based on orchestration functions 960.

It should be understood that some of the devices in 910 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 922, 924 may operate as security feature enforcement points for local resources allocated to multiple tenants per node. Additionally, tenant runtime and application execution (e.g., in instances 932, 934) may serve as an enforcement point for a security feature that creates a virtual edge abstraction of resources spanning potentially multiple physical hosting platforms. Finally, the orchestration functions 960 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers. FaaS engines, Servlets, servers, or other computation abstraction that may be partitioned according to a DICE layering and fan-out structure to support a RoT context for each. Accordingly, the respective RoTs spanning devices 910, 922, and 940 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 9. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 922, 924 may implement the use of containers, such as with the use of a container "pod" 926, 928 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 932, 934 are partitioned according to the needs of each container.

With the use of container pods, a pod controller oversees the partitioning and allocation of containers and resources. The pod controller receives instructions from an orchestrator (e.g., orchestrator 960) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 960 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute, and a different shared pod controller is installed and invoked prior to the second pod executing.

Figure 10:
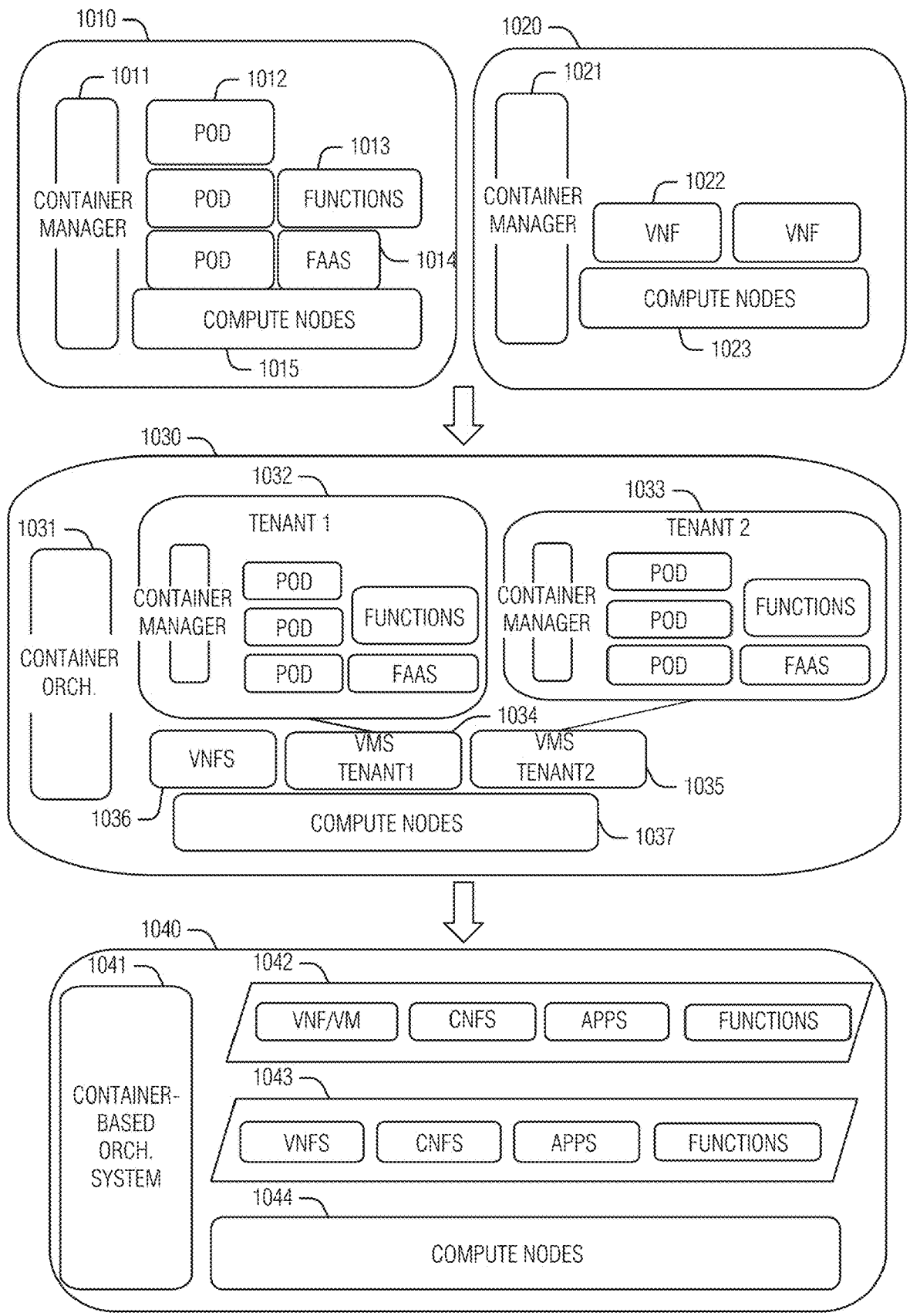
FIG. 10 illustrates various compute arrangements deploying containers in an edge computing system.

FIG. 10 illustrates additional compute arrangements deploying containers in an edge computing system. As a simplified example, system arrangements 1010, 1020 depict settings in which a pod controller (e.g., container managers 1011, 1021, and container orchestrator 1031) is adapted to launch containerized pods, functions, and functions-as-a-service instances through execution via compute nodes (1015 in arrangement 1010), or to separately execute containerized virtualized network functions through execution via compute nodes (1023 in arrangement 1020). This arrangement is adapted for use of multiple tenants in system arrangement 1030 (using compute nodes 1037), where containerized pods (e.g., pods 1012), functions (e.g., functions 1013, VNFs 1022, 1036), and functions-as-a-service instances (e.g., FaaS instance 1014) are launched within virtual machines (e.g., VMs 1034, 1035 for tenants 1032, 1033) specific to respective tenants (aside the execution of virtualized network functions). This arrangement is further adapted for use in system arrangement 1040, which provides containers 1042, 1043, or execution of the various functions, applications, and functions on compute nodes 1044, as coordinated by an container-based orchestration system 1041.

The system arrangements of depicted in FIG. 10 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 10, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 11A:
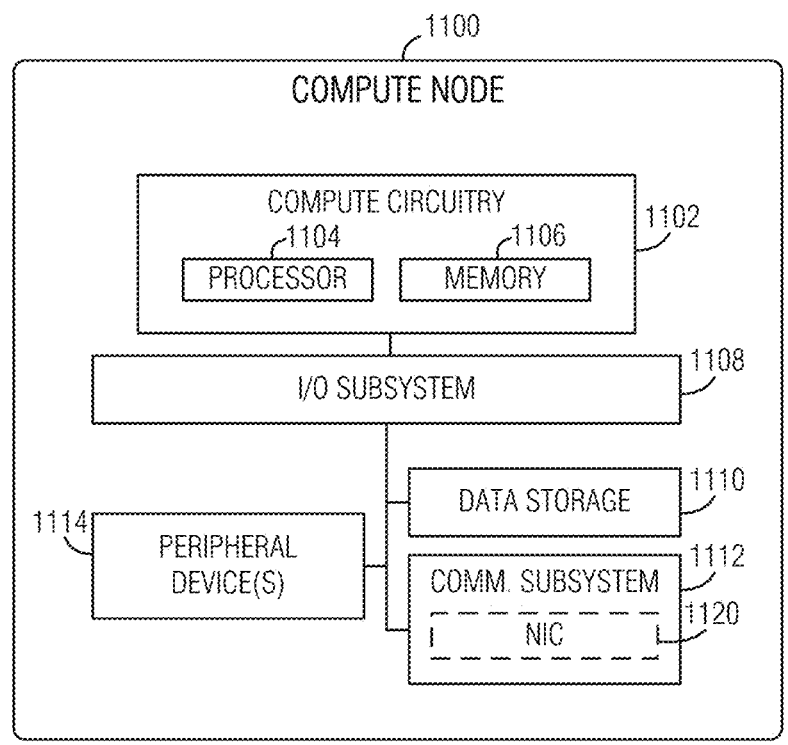
FIG. 11A provides an overview of example components for compute deployed at a compute node in an edge computing system.

In further examples, any of the compute nodes or devices discussed with reference to the present edge computing systems and environment may be fulfilled based on the components depicted in FIGS. 11A and 11B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

In the simplified example depicted in FIG. 1A, an edge compute node 1100 includes a compute engine (also referred to herein as "compute circuitry") 1102, an input/output (I/O) subsystem 1108, data storage 1110, a communication circuitry subsystem 1112, and, optionally, one or more peripheral devices 1114. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1100 may be embodied as any type of engine, device, or collection of devices capable of performing various compute functions. In some examples, the compute node 1100 may be embodied as a single device such as an integrated circuit, an embedded system, a field-programmable gate array (FPGA), a system-on-a-chip (SOC), or other integrated system or device. In the illustrative example, the compute node 1100 includes or is embodied as a processor 1104 and a memory 1106. The processor 1104 may be embodied as any type of processor capable of performing the functions described herein (e.g., executing an application). For example, the processor 1104 may be embodied as a multi-core processor(s), a microcontroller, a processing unit, a specialized or special purpose processing unit, or other processor or processing/controlling circuit.

In some examples, the processor 1104 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1104 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1104 may work in coordination with each other to execute many types of operations and instructions within and on behalf of the compute node 1100.

The memory 1106 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1106 may be integrated into the processor 1104. The memory 1106 may store various software and data used during operation such as one or more applications, data operated on by the application(s), libraries, and drivers.

The compute circuitry 1102 is communicatively coupled to other components of the compute node 1100 via the I/O subsystem 1108, which may be embodied as circuitry or components to facilitate input/output operations with the compute circuitry 1102 (e.g., with the processor 1104 or the main memory 1106) and other components of the compute circuitry 1102. For example, the I/O subsystem 1108 may be embodied as, or otherwise include, memory controller hubs, input/output control hubs, integrated sensor hubs, firmware devices, communication links (e.g., point-to-point links, bus links, wires, cables, light guides, printed circuit board traces, etc.), or other components and subsystems to facilitate the input/output operations. In some examples, the I/O subsystem 1108 may form a portion of a system-on-a-chip (SoC) and be incorporated, along with one or more of the processor 1104, the memory 1106, and other components of the compute circuitry 1102, into the compute circuitry 1102.

The one or more illustrative data storage devices 1110 may be embodied as any type of devices configured for short-term or long-term storage of data such as, for example, memory devices and circuits, memory cards, hard disk drives, solid-state drives, or other data storage devices. Individual data storage devices 1110 may include a system partition that stores data and firmware code for the data storage device 1110. Individual data storage devices 1110 may also include one or more operating system partitions that store data files and executables for operating systems depending on, for example, the type of compute node 1100.

The communication circuitry 112 may be embodied as any communication circuit, device, or collection thereof, capable of enabling communications over a network between the compute circuitry 1102 and another compute device (e.g., an edge gateway of an implementing edge computing system). The communication circuitry 1112 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol. Ethernet, Bluetooth®. Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1112 includes a network interface controller (NIC) 1120, which may also be referred to as a host fabric interface (HFI). The NIC 1120 may be embodied as one or more add-in-boards, daughter cards, network interface cards, controller chips, chipsets, or other devices that may be used by the compute node 1100 to connect with another compute device (e.g., an edge gateway node). In some examples, the NIC 1120 may be embodied as part of a system-on-a-chip (SoC) that includes one or more processors, or included on a multichip package that also contains one or more processors. In some examples, the NIC 1120 may include a local processor (not shown) or a local memory (not shown) that are both local to the NIC 1120. In such examples, the local processor of the NIC 1120 may be capable of performing one or more of the functions of the compute circuitry 1102 described herein. Additionally, or alternatively, in such examples, the local memory of the NIC 1120 may be integrated into one or more components of the client compute node at the board level, socket level, chip level, or other levels.

Additionally, in some examples, a respective compute node 1100 may include one or more peripheral devices 1114. Such peripheral devices 1114 may include any type of peripheral device found in a compute device or server such as audio input devices, a display, other input/output devices, interface devices, or other peripheral devices, depending on the particular type of the compute node 1100. In further examples, the compute node 1100 may be embodied by a respective edge compute node (whether a client, gateway, or aggregation node) in an edge computing system or like forms of appliances, computers, subsystems, circuitry, or other components.

Figure 11B:
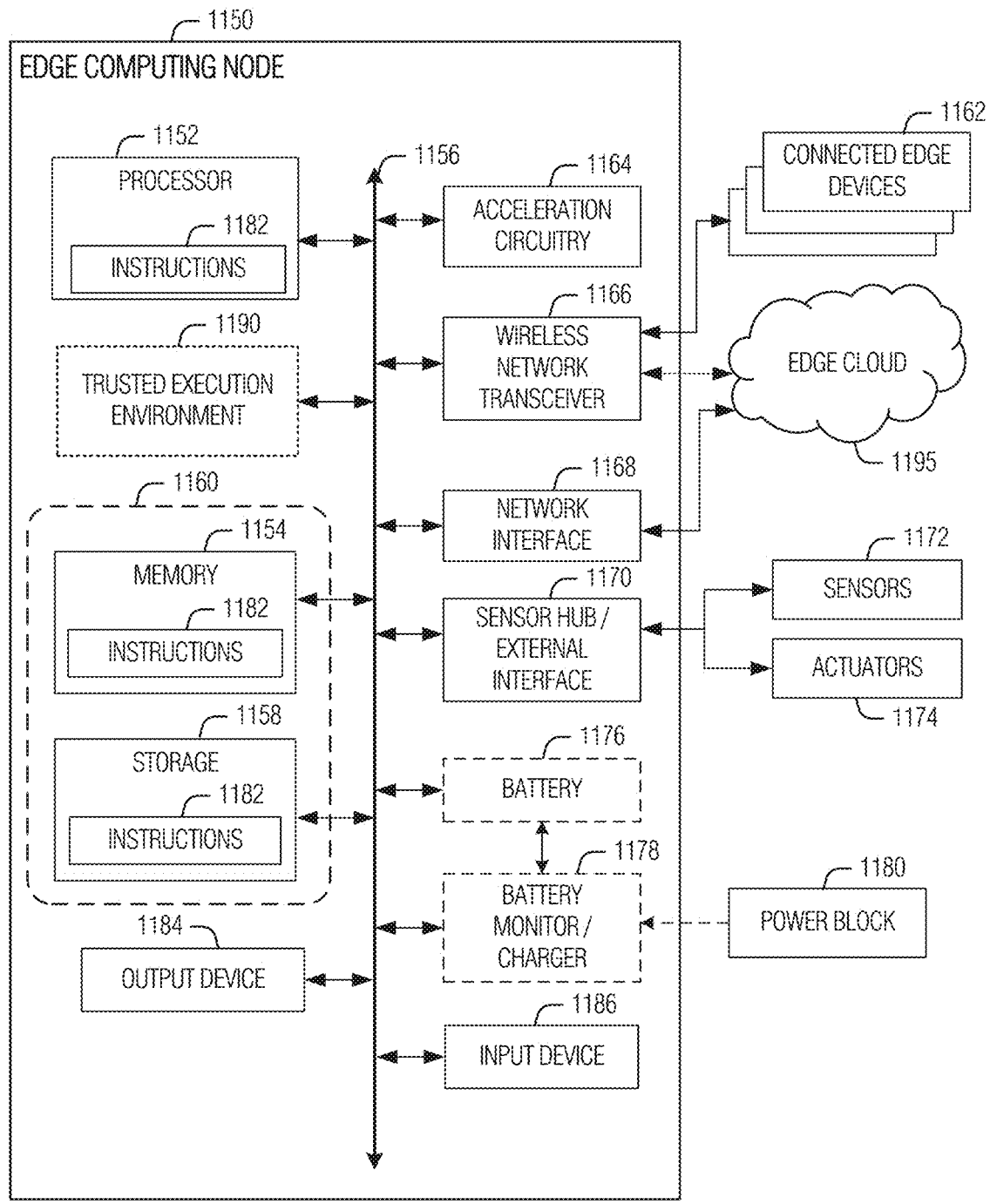
FIG. 11B provides a further overview of example components within a computing device in an edge computing system.

In a more detailed example, FIG. 11B illustrates a block diagram of an example of components that may be present in an edge computing node 1150 for implementing the techniques (e.g., operations, processes, methods, and methodologies) described herein. This edge computing node 1150 provides a closer view of the respective components of node 1100 when implemented as or as part of a computing device (e.g., as a mobile device, a base station, server, gateway, etc.). The edge computing node 1150 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 1150, or as components otherwise incorporated within a chassis of a larger system.

The edge computing device 1150 may include processing circuitry in the form of a processor 1152, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1152 may be a part of a system on a chip (SoC) in which the processor 1152 and other components are formed into a single integrated circuit, or a single package, such as the Edison™ or Galileo™ SoC boards from Intel Corporation. Santa Clara. California. As an example, the processor 1152 may include an Intel® Architecture Core™ based CPU processor, such as a Quark™ an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies. Inc., or an OMAP™ processor from Texas Instruments, Inc. The processor 1152 and accompanying circuitry may be provided in a single socket form factor, multiple socket form factor, or a variety of other formats, including in limited hardware configurations or configurations that include fewer than all elements shown in FIG. 11B.

The processor 1152 may communicate with a system memory 1154 over an interconnect 1156 (e.g., a bus). Any number of memory devices may be used to provide for a given amount of system memory. As examples, the memory 1154 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM. JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example, the storage 1158 may be implemented via a solid-state disk drive (SSDD). Other devices that may be used for the storage 1158 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory. NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1156 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1156 may couple the processor 1152 to a transceiver 1166, for communications with the connected edge devices 1162. The transceiver 1166 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1162. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1166 (or multiple transceivers) may communicate using multiple standards or radios for communications at a different range. For example, the edge computing node 1150 may communicate with close devices, e.g., within about 10 meters, using a local transceiver based on Bluetooth Low Energy (BLE), or another low power radio, to save power. More distant connected edge devices 1162, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1166 (e.g., a radio transceiver) may be included to communicate with devices or services in a cloud (e.g., an edge cloud 1195) via local or wide area network protocols. The wireless network transceiver 1166 may be a low-power wide-area (LPWA) transceiver that follows the IEEE 802.15.4, or IEEE 802.15.4g standards, among others. The edge computing node 1150 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1166, as described herein. For example, the transceiver 1166 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1166 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1168 may be included to provide a wired communication to nodes of the edge cloud 1195 or to other devices, such as the connected edge devices 1162 (e.g., operating in a mesh). The wired communication may provide an Ethernet connection or may be based on other types of networks, such as Controller Area Network (CAN), Local interconnect Network (LIN). DeviceNet. ControlNet. Data Highway+. PROFIBUS, or PROFINET, among many others. An additional NIC 1168 may be included to enable connecting to a second network, for example, a first NIC 1168 providing communications to the cloud over Ethernet, and a second NIC 1168 providing communications to other devices over another type of network.

Given the variety of types of applicable communications from the device to another component or network, applicable communications circuitry used by the device may include or be embodied by any one or more of components 1164, 1166, 1168, or 1170. Accordingly, in various examples, applicable means for communicating (e.g., receiving, transmitting, etc.) may be embodied by such communications circuitry.

The edge computing node 1150 may include or be coupled to acceleration circuitry 1164, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1156 may couple the processor 1152 to a sensor hub or external interface 1170 that is used to connect additional devices or subsystems. The devices may include sensors 1172, such as accelerometers, level sensors, flow sensors, optical light sensors, camera sensors, temperature sensors, global navigation system (e.g., GPS) sensors, pressure sensors, barometric pressure sensors, and the like. The hub or interface 1170 further may be used to connect the edge computing node 1150 to actuators 1174, such as power switches, valve actuators, an audible sound generator, a visual warning device, and the like.

In some optional examples, various input/output (I/O) devices may be present within or connected to, the edge computing node 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 1150. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1176 may power the edge computing node 1150, although, in examples in which the edge computing node 1150 is mounted in a fixed location, it may have a power supply coupled to an electrical grid, or the battery may be used as a backup or for temporary capabilities. The battery 1176 may be a lithium ion battery, or a metal-air battery, such as a zinc-air battery, an aluminum-air battery, a lithium-air battery, and the like.

A battery monitor/charger 1178 may be included in the edge computing node 1150 to track the state of charge (SoCh) of the battery 1176, if included. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1178 may communicate the information on the battery 1176 to the processor 1152 over the interconnect 1156. The battery monitor/charger 1178 may also include an analog-to-digital (ADC) converter that enables the processor 1152 to directly monitor the voltage of the battery 1176 or the current flow from the battery 1176. The battery parameters may be used to determine actions that the edge computing node 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the edge computing node 1150. A wireless battery charging circuit, such as an LTC4020 chip from Linear Technologies of Milpitas, California, among others, may be included in the battery monitor/charger 1178. The specific charging circuits may be selected based on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1154, the storage 1158, or the processor 1152 may be embodied as a non-transitory, machine-readable medium 1160 including code to direct the processor 1152 to perform electronic operations in the edge computing node 1150. The processor 1152 may access the non-transitory, machine-readable medium 1160 over the interconnect 1156. For instance, the non-transitory, machine-readable medium 1160 may be embodied by devices described for the storage 1158 or may include specific storage units such as optical disks, flash drives, or any number of other hardware devices. The non-transitory, machine-readable medium 1160 may include instructions to direct the processor 1152 to perform a specific sequence or flow of actions, for example, as described with respect to the flowchart(s) and block diagram(s) of operations and functionality depicted above. As used herein, the terms "machine-readable medium" and "computer-readable medium" are interchangeable. Also in a specific example, the instructions 1182 on the processor 1152 (separately, or in combination with the instructions 1182 of the machine readable medium 1160) may configure execution or operation of a trusted execution environment (TEE) 1190. In an example, the TEE 1190 operates as a protected area accessible to the processor 1152 for secure execution of instructions and secure access to data. Various implementations of the TEE 1190, and an accompanying secure area in the processor 1152 or the memory 1154 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1150 through the TEE 1190 and the processor 1152.

Figure 12:
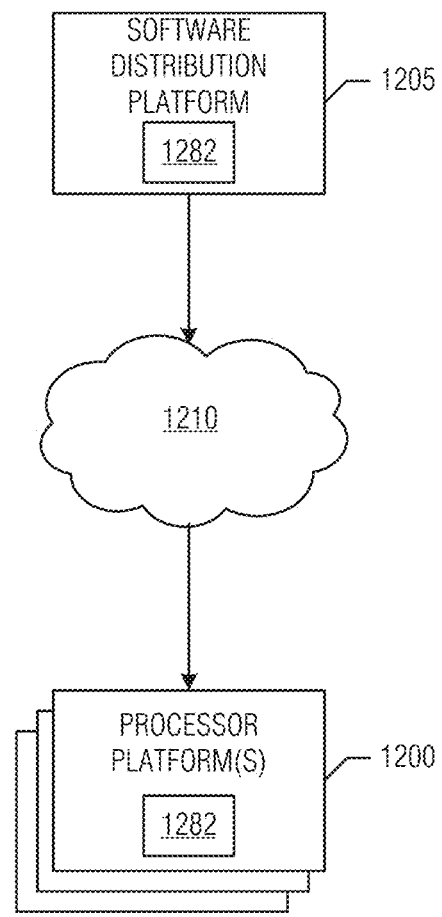
FIG. 12 illustrates an example software distribution platform to distribute software.

FIG. 12 illustrates an example software distribution platform 1205 to distribute software, such as the example computer readable instructions 1282 of FIG. 12, to one or more devices, such as example processor platform(s) 1200 or connected edge devices. The example software distribution platform 1205 may be implemented by any computer server, data facility, cloud service, etc., capable of storing and transmitting software to other computing devices (e.g., third parties, or connected edge devices). Example connected edge devices may be customers, clients, managing devices (e.g., servers), third parties (e.g., customers of an entity owning or operating the software distribution platform 1205). Example connected edge devices may operate in commercial or home automation environments. In some examples, a third party is a developer, a seller, or a licensor of software such as the example computer readable instructions 1282 of FIG. 12. The third parties may be consumers, users, retailers, OEMs, etc. that purchase or license the software for use or re-sale or sub-licensing. In some examples, distributed software causes display of one or more user interfaces (UIs) or graphical user interfaces (GUIs) to identify the one or more devices (e.g., connected edge devices) geographically or logically separated from each other (e.g., physically separated IoT devices chartered with the responsibility of water distribution control (e.g., pumps), electricity distribution control (e.g., relays), etc.).

In the illustrated example of FIG. 12, the software distribution platform 1205 includes one or more servers and one or more storage devices. The storage devices store the computer readable instructions 1282, which may correspond to the example computer readable instructions illustrated in the figures and described herein. The one or more servers of the example software distribution platform 1205 are in communication with a network 1210, which may correspond to any one or more of the Internet or any of the example networks described herein. In some examples, the one or more servers are responsive to requests to transmit the software to a requesting party as part of a commercial transaction. Payment for the delivery, sale or license of the software may be handled by the one or more servers of the software distribution platform or via a third-party payment entity. The servers enable purchasers or licensors to download the computer readable instructions 1282 from the software distribution platform 1205. For example, the software, which may correspond to the example computer readable instructions described herein, may be downloaded to the example processor platform(s) 1200 (e.g., example connected edge devices), which are to execute the computer readable instructions 1282 to implement the technique. In some examples, one or more servers of the software distribution platform 1205 are communicatively connected to one or more security domains or security devices through which requests and transmissions of the example computer readable instructions 1282 must pass. In some examples, one or more servers of the software distribution platform 1205 periodically offer, transmit, or force updates to the software (e.g., the example computer readable instructions 1282 of FIG. 12) to ensure improvements, patches, updates, etc. are distributed and applied to the software at the end user devices.

In the illustrated example of FIG. 12, the computer readable instructions 1282 are stored on storage devices of the software distribution platform 1205 in a particular format. A format of computer readable instructions includes, but is not limited to a particular code language (e.g., Java, JavaScript, Python. C. C#, SQL, HTML, etc.), or a particular code state (e.g., uncompiled code (e.g., ASCII), interpreted code, linked code, executable code (e.g., a binary), etc.). In some examples, the computer readable instructions 1282 stored in the software distribution platform 1205 are in a first format when transmitted to the example processor platform (s) 1200. In some examples, the first format is an executable binary in which particular types of the processor platform(s) 1200 can execute. However, in some examples, the first format is uncompiled code that requires one or more preparation tasks to transform the first format to a second format to enable execution on the example processor platform(s) 1200. For instance, the receiving processor platform(s) 1200 may need to compile the computer readable instructions 1282 in the first format to generate executable code in a second format that is capable of being executed on the processor platform(s) 1200. In still other examples, the first format is interpreted code that, upon reaching the processor platform(s) 1200, is interpreted by an interpreter to facilitate execution of instructions.

Figure 13:
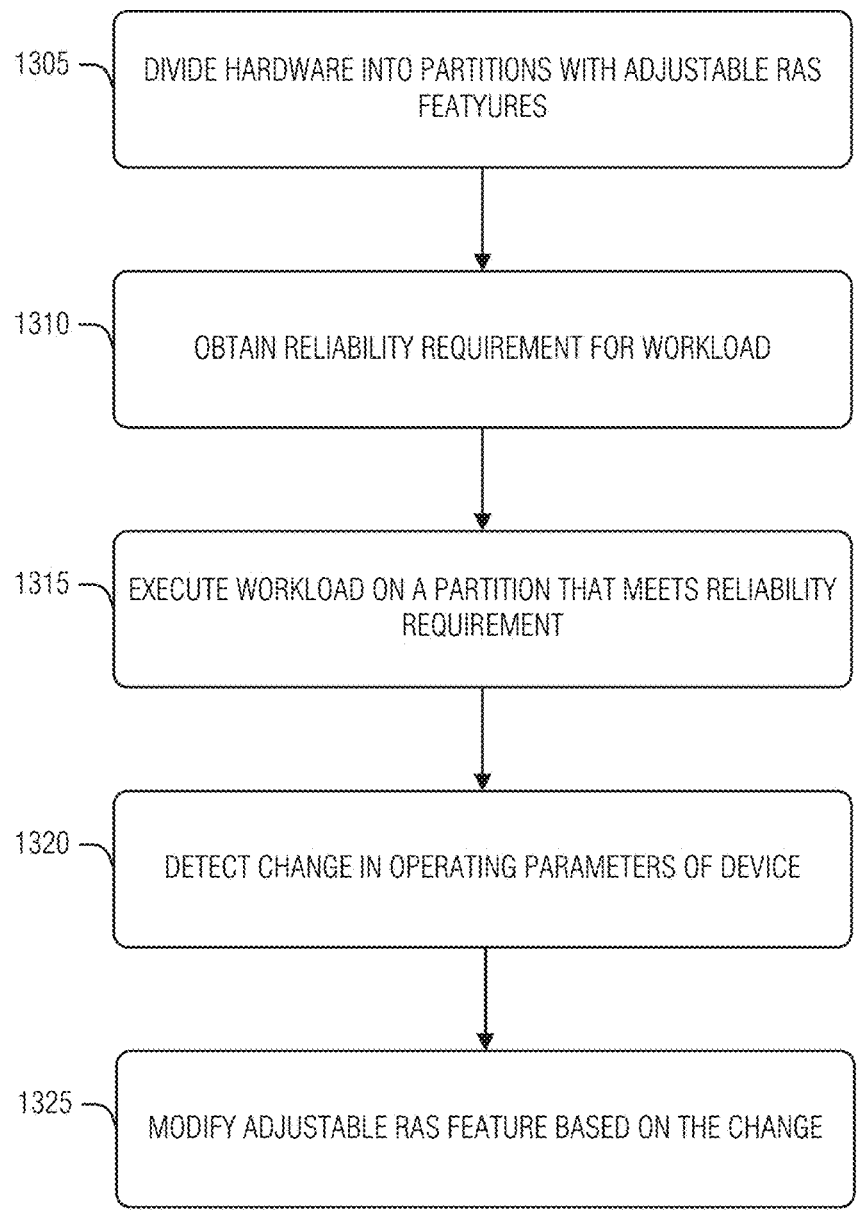
FIG. 13 illustrates a flow diagram of an example of a method for power-based adaptive hardware reliability on a device, according to an embodiment.

FIG. 13 illustrates a flow diagram of an example of a method 1300 for power-based adaptive hardware reliability on a device, according to an embodiment. The operations of the method 1300 are performed by computational hardware, such as that described above or below (e.g., processing circuitry).

At operation 1305, a hardware platform is divided into several partitions. Here, each partition includes a hardware component with an adjustable reliability feature (e.g., RAS feature). In an example, the several partitions are placed into one of multiple reliability categories.

At operation 1310, a workload with a reliability requirement is obtained. In an example, the reliability requirement is obtained by profiling the workload. In an example, the reliability requirement is obtained by metadata distributed with the workload.

At operation 1315, the workload is executed on a partition of the several partitions in a reliability category that satisfies the reliability requirements.

At operation 1320, a change in operating parameters for the device is detected. In an example, the operating parameters subject to the change include power. In an example, the change is in a reduction of power.

In an example, the change is a predicted reduction in power. In an example, the predicted reduction in power is based on historical power supply and a current context. In an example, the current context includes at least one of time, temperature, or weather.

In an example, the operating parameters subject to the change include temperature. In an example, the change is in an increase in temperature.

In an example, the change is a predicted increase in temperature. In an example, the predicted increase in temperature is based on temperature measurements and a current context. In an example, the current context includes at least one of time, temperature, or weather.

In an example, detecting the change in operating parameters for the device includes monitoring errors during execution of the workload and determining that the errors are beyond a threshold for the reliability category.

At operation 1325, the adjustable reliability feature for the partition is adjusted based on the change in the operating parameters of the device. In an example, where the operating parameter changed is a reduction in power, modifying the adjustable parameter includes reducing power consumption by disabling or reducing an intervention rate of the adjustable parameter. In an example, the adjustable parameter is a memory refresh rate or patrol scrubbing operation.

In an example, where the operating parameter changed is an increase in temperature, modifying the adjustable parameter includes increasing reliability by enabling or increasing an intervention rate of the adjustable parameter. In an example, the adjustable parameter is a memory refresh rate or patrol scrubbing operation.

In an example, the method 1300 is extended to include additional operations. Specifically, moving the partition to a second reliability category in response to modifying the adjustable parameter. Then moving the workload to a second partition that has the reliability category.

Figure 14:
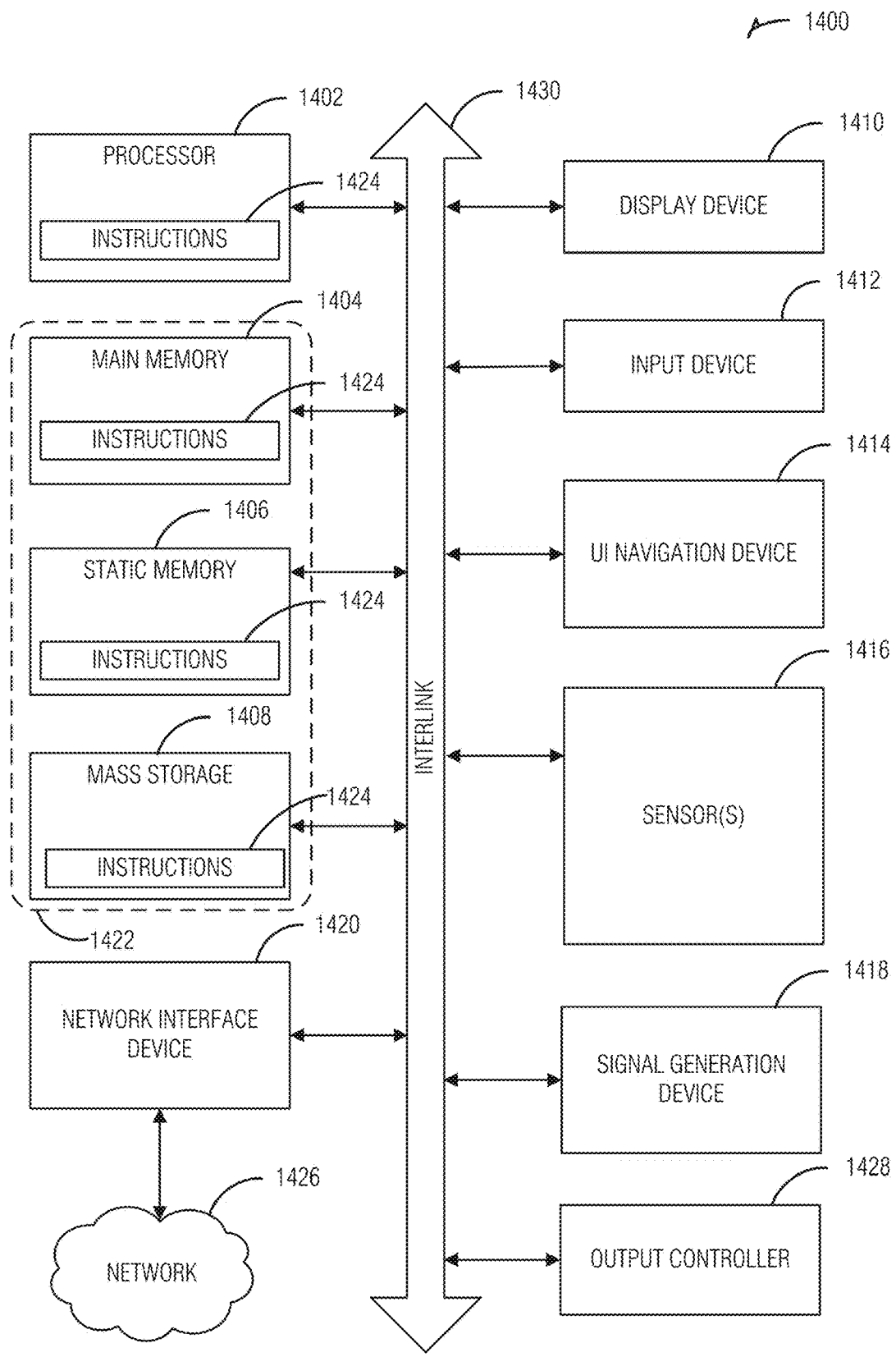
FIG. 14 is a block diagram illustrating an example of a machine upon which one or more embodiments may be implemented.

FIG. 14 illustrates a block diagram of an example machine 1400 upon which any one or more of the techniques (e.g., methodologies) discussed herein may perform. Examples, as described herein, may include, or may operate by, logic or a number of components, or mechanisms in the machine 1400. Circuitry (e.g., processing circuitry) is a collection of circuits implemented in tangible entities of the machine 1400 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1400 follow.

In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. The machine 1400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1400 may include a hardware processor 1402 (e.g., a central processing unit (CPU), a graphics processing unit (GPU), a hardware processor core, or any combination thereof), a main memory 1404, a static memory (e.g., memory or storage for firmware, microcode, a basic-input-output (BIOS), unified extensible firmware interface (UEFI), etc.) 1406, and mass storage 1408 (e.g., hard drives, tape drives, flash storage, or other block devices) some or all of which may communicate with each other via an interlink (e.g., bus) 1430. The machine 1400 may further include a display unit 1410, an alphanumeric input device 1412 (e.g., a keyboard), and a user interface (UI) navigation device 1414 (e.g., a mouse). In an example, the display unit 1410, input device 1412 and UI navigation device 1414 may be a touch screen display. The machine 1400 may additionally include a storage device (e.g., drive unit) 1408, a signal generation device 1418 (e.g., a speaker), a network interface device 1420, and one or more sensors 1416, such as a global positioning system (GPS) sensor, compass, accelerometer, or other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1402, the main memory 1404, the static memory 1406, or the mass storage 1408 may be, or include, a machine readable medium 1422 on which is stored one or more sets of data structures or instructions 1424 (e.g., software) embodying or utilized by any one or more of the techniques or functions described herein. The instructions 1424 may also reside, completely or at least partially, within any of registers of the processor 1402, the main memory 1404, the static memory 1406, or the mass storage 1408 during execution thereof by the machine 1400. In an example, one or any combination of the hardware processor 1402, the main memory 1404, the static memory 1406, or the mass storage 1408 may constitute the machine readable media 1422. While the machine readable medium 1422 is illustrated as a single medium, the term "machine readable medium" may include a single medium or multiple media (e.g., a centralized or distributed database, or associated caches and servers) configured to store the one or more instructions 1424.

The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1422 may be representative of the instructions 1424, such as instructions 1424 themselves or a format from which the instructions 1424 may be derived. This format from which the instructions 1424 may be derived may include source code, encoded instructions (e.g., in compressed or encrypted form), packaged instructions (e.g., split into multiple packages), or the like. The information representative of the instructions 1424 in the machine readable medium 1422 may be processed by processing circuitry into the instructions to implement any of the operations discussed herein. For example, deriving the instructions 1424 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1424.

In an example, the derivation of the instructions 1424 may include assembly, compilation, or interpretation of the information (e.g., by the processing circuitry) to create the instructions 1424 from some intermediate or preprocessed format provided by the machine readable medium 1422. The information, when provided in multiple parts, may be combined, unpacked, and modified to create the instructions 1424. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1424 may be further transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®. IEEE 802.16 family of standards known as WiMax®. IEEE 802.15.4 family of standards, peer-to-peer (P2P) networks, among others. In an example, the network interface device 1420 may include one or more physical jacks (e.g., Ethernet, coaxial, or phone jacks) or one or more antennas to connect to the communications network 1426. In an example, the network interface device 1420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1400, and includes digital or analog communications signals or other intangible medium to facilitate communication of such software. A transmission medium is a machine readable medium.

Additional Notes & Examples

Example 1 is an apparatus for power-based adaptive hardware reliability on a device, the apparatus comprising: machine readable media including instructions; and processing circuitry that, when in operation, is configured by the instructions to: divide a hardware platform into multiple partitions, each partition including a hardware component with an adjustable reliability feature, the several partitions placed into one of multiple reliability categories; obtain a workload with a reliability requirement; execute the workload on a partition of the several partitions in a reliability category that satisfies the reliability requirements; detect a change in operating parameters for the device; and modify the adjustable reliability feature for the partition based on the change in the operating parameters of the device.

In Example 2, the subject matter of Example 1, wherein the operating parameters subject to the change include power availability.

In Example 3, the subject matter of Example 2, wherein the change is a current reduction of power availability.

In Example 4, the subject matter of any of Examples 2-3, wherein the change is a predicted reduction in power availability.

In Example 5, the subject matter of Example 4, wherein the predicted reduction in power availability is based on historical power supply and a current context.

In Example 6, the subject matter of Example 5, wherein the current context includes at least one of time, temperature, or weather.

In Example 7, the subject matter of any of Examples 3-6, wherein, to modify the adjustable reliability feature, the pc_ is configured to reduce power consumption by disabling or reducing an intervention rate of the adjustable parameter.

In Example 8, the subject matter of Example 7, wherein the adjustable reliability feature is a memory refresh rate or patrol scrubbing operation.

In Example 9, the subject matter of any of Examples 1-8, wherein the operating parameters subject to the change include temperature.

In Example 10, the subject matter of Example 9, wherein the change is an increase in temperature.

In Example 11, the subject matter of Example 10, wherein, to modify the adjustable reliability feature, the processing circuitry is configured to increase reliability by enabling or increasing an intervention rate of the adjustable parameter.

In Example 12, the subject matter of Example 11, wherein the adjustable parameter is a memory refresh rate or patrol scrubbing operation.

In Example 13, the subject matter of any of Examples 9-12, wherein the change is a predicted increase in temperature.

In Example 14, the subject matter of Example 13, wherein the predicted increase in temperature is based on historical temperature measurements and a current context.

In Example 15, the subject matter of Example 14, wherein the current context includes at least one of time, temperature, or weather.

In Example 16, the subject matter of any of Examples 1-15, wherein the processing circuitry is configured to: move the partition to a second reliability category in response to modifying the adjustable parameter; and move the workload to a second partition that has the reliability category.

In Example 17, the subject matter of any of Examples 1-16, wherein, to detect the change in operating parameters for the device, the processing circuitry is configured to: monitor errors during execution of the workload; and determine that the errors are beyond a threshold for the reliability category.

In Example 18, the subject matter of any of Examples 1-17, wherein the reliability requirement is obtained by profiling the workload.

In Example 19, the subject matter of any of Examples 1-18, wherein the reliability requirement is obtained by metadata distributed with the workload.

Example 20 is a method for power-based adaptive hardware reliability on a device, the method comprising: dividing a hardware platform into multiple partitions, each partition including a hardware component with an adjustable reliability feature, the several partitions placed into one of multiple reliability categories; obtaining a workload with a reliability requirement; executing the workload on a partition of the several partitions in a reliability category that satisfies the reliability requirements; detecting a change in operating parameters for the device; and modifying the adjustable reliability feature for the partition based on the change in the operating parameters of the device.

In Example 21, the subject matter of Example 20, wherein the operating parameters subject to the change include power availability.

In Example 22, the subject matter of Example 21, wherein the change is a current reduction of power availability.

In Example 23, the subject matter of any of Examples 21-22, wherein the change is a predicted reduction in power availability.

In Example 24, the subject matter of Example 23, wherein the predicted reduction in power availability is based on historical power supply and a current context.

In Example 25, the subject matter of Example 24, wherein the current context includes at least one of time, temperature, or weather.

In Example 26, the subject matter of any of Examples 22-25, wherein modifying the adjustable reliability feature includes reducing power consumption by disabling or reducing an intervention rate of the adjustable parameter.

In Example 27, the subject matter of Example 26, wherein the adjustable reliability feature is a memory refresh rate or patrol scrubbing operation.

In Example 28, the subject matter of any of Examples 20-27, wherein the operating parameters subject to the change include temperature.

In Example 29, the subject matter of Example 28, wherein the change is an increase in temperature.

In Example 30, the subject matter of Example 29, wherein modifying the adjustable reliability feature includes increasing reliability by enabling or increasing an intervention rate of the adjustable parameter.

In Example 31, the subject matter of Example 30, wherein the adjustable parameter is a memory refresh rate or patrol scrubbing operation.

In Example 32, the subject matter of any of Examples 28-31, wherein the change is a predicted increase in temperature.

In Example 33, the subject matter of Example 32, wherein the predicted increase in temperature is based on historical temperature measurements and a current context.

In Example 34, the subject matter of Example 33, wherein the current context includes at least one of time, temperature, or weather.

In Example 35, the subject matter of any of Examples 20-34, comprising: moving the partition to a second reliability category in response to modifying the adjustable parameter; and moving the workload to a second partition that has the reliability category.

In Example 36, the subject matter of any of Examples 20-35, wherein detecting the change in operating parameters for the device includes: monitoring errors during execution of the workload: and determining that the errors are beyond a threshold for the reliability category.

In Example 37, the subject matter of any of Examples 20-36, wherein the reliability requirement is obtained by profiling the workload.

In Example 38, the subject matter of any of Examples 20-37, wherein the reliability requirement is obtained by metadata distributed with the workload.

Example 39 is at least one machine readable medium including instructions for power-based adaptive hardware reliability on a device, the instructions, when executed by processing circuitry, cause the processing circuitry to perform operations comprising: dividing a hardware platform into multiple partitions, each partition including a hardware component with an adjustable reliability feature, the several partitions placed into one of multiple reliability categories; obtaining a workload with a reliability requirement; executing the workload on a partition of the several partitions in a reliability category that satisfies the reliability requirements; detecting a change in operating parameters for the device; and modifying the adjustable reliability feature for the partition based on the change in the operating parameters of the device.

In Example 40, the subject matter of Example 39, wherein the operating parameters subject to the change include power availability.

In Example 41, the subject matter of Example 40, wherein the change is a current reduction of power availability.

In Example 42, the subject matter of any of Examples 40-41, wherein the change is a predicted reduction in power availability.

In Example 43, the subject matter of Example 42, wherein the predicted reduction in power availability is based on historical power supply and a current context.

In Example 44, the subject matter of Example 43, wherein the current context includes at least one of time, temperature, or weather.

In Example 45, the subject matter of any of Examples 41-44, wherein modifying the adjustable reliability feature includes reducing power consumption by disabling or reducing an intervention rate of the adjustable parameter.

In Example 46, the subject matter of Example 45, wherein the adjustable reliability feature is a memory refresh rate or patrol scrubbing operation.

In Example 47, the subject matter of any of Examples 39-46, wherein the operating parameters subject to the change include temperature.

In Example 48, the subject matter of Example 47, wherein the change is an increase in temperature.

In Example 49, the subject matter of Example 48, wherein modifying the adjustable reliability feature includes increasing reliability by enabling or increasing an intervention rate of the adjustable parameter.

In Example 50, the subject matter of Example 49, wherein the adjustable parameter is a memory refresh rate or patrol scrubbing operation.

In Example 51, the subject matter of any of Examples 47-50, wherein the change is a predicted increase in temperature.

In Example 52, the subject matter of Example 51, wherein the predicted increase in temperature is based on historical temperature measurements and a current context.

In Example 53, the subject matter of Example 52, wherein the current context includes at least one of time, temperature, or weather.

In Example 54, the subject matter of any of Examples 39-53, wherein the operations comprise: moving the partition to a second reliability category in response to modifying the adjustable parameter; and moving the workload to a second partition that has the reliability category.

In Example 55, the subject matter of any of Examples 39-54, wherein detecting the change in operating parameters for the device includes: monitoring errors during execution of the workload; and determining that the errors are beyond a threshold for the reliability category.

In Example 56, the subject matter of any of Examples 39-55, wherein the reliability requirement is obtained by profiling the workload.

In Example 57, the subject matter of any of Examples 39-56, wherein the reliability requirement is obtained by metadata distributed with the workload.

Example 58 is a system for power-based adaptive hardware reliability on a device, the system comprising: means for dividing a hardware platform into multiple partitions, each partition including a hardware component with an adjustable reliability feature, the several partitions placed into one of multiple reliability categories; means for obtaining a workload with a reliability requirement, means for executing the workload on a partition of the several partitions in a reliability category that satisfies the reliability requirements; means for detecting a change in operating parameters for the device; and means for modifying the adjustable reliability feature for the partition based on the change in the operating parameters of the device.

In Example 59, the subject matter of Example 58, wherein the operating parameters subject to the change include power availability.

In Example 60, the subject matter of Example 59, wherein the change is a current reduction of power availability.

In Example 61, the subject matter of any of Examples 59-60, wherein the change is a predicted reduction in power availability.

In Example 62, the subject matter of Example 61, wherein the predicted reduction in power availability is based on historical power supply and a current context.

In Example 63, the subject matter of Example 62, wherein the current context includes at least one of time, temperature, or weather.

In Example 64, the subject matter of any of Examples 60-63, wherein the means for modifying the adjustable reliability feature include means for reducing power consumption by disabling or reducing an intervention rate of the adjustable parameter.

In Example 65, the subject matter of Example 64, wherein the adjustable reliability feature is a memory refresh rate or patrol scrubbing operation.

In Example 66, the subject matter of any of Examples 58-65, wherein the operating parameters subject to the change include temperature.

In Example 67, the subject matter of Example 66, wherein the change is an increase in temperature.

In Example 68, the subject matter of Example 67, wherein the means for modifying the adjustable reliability feature include means for increasing reliability by enabling or increasing an intervention rate of the adjustable parameter.

In Example 69, the subject matter of Example 68, wherein the adjustable parameter is a memory refresh rate or patrol scrubbing operation.

In Example 70, the subject matter of any of Examples 66-69, wherein the change is a predicted increase in temperature.

In Example 71, the subject matter of Example 70, wherein the predicted increase in temperature is based on historical temperature measurements and a current context.

In Example 72, the subject matter of Example 71, wherein the current context includes at least one of time, temperature, or weather.

In Example 73, the subject matter of any of Examples 58-72, comprising: means for moving the partition to a second reliability category in response to modifying the adjustable parameter; and means for moving the workload to a second partition that has the reliability category.

In Example 74, the subject matter of any of Examples 58-73, wherein the means for detecting the change in operating parameters for the device include: means for monitoring errors during execution of the workload; and means for determining that the errors are beyond a threshold for the reliability category.

In Example 75, the subject matter of any of Examples 58-74, wherein the reliability requirement is obtained by profiling the workload.

In Example 76, the subject matter of any of Examples 58-75, wherein the reliability requirement is obtained by metadata distributed with the workload.

Example 77 is at least one machine-readable medium including instructions that, when executed by processing circuitry, cause the processing circuitry to perform operations to implement of any of Examples 1-76.

Example 78 is an apparatus comprising means to implement of any of Examples 1-76.

Example 79 is a system to implement of any of Examples 1-76.

Example 80 is a method to implement of any of Examples 1-76.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus comprising:
    at least one non-transitory machine readable medium including instructions; and
    processing circuitry that, when in operation, is configured by the instructions to:
        divide a hardware platform of a device into multiple partitions, a partition of the multiple partitions including a hardware component with an adjustable reliability feature, the partition placed into a reliability category of multiple reliability categories;
        obtain a workload with a reliability requirement;
        execute the workload on the partition based on the reliability category of the partition satisfying the reliability requirement of the workload;
        detect a change in an operating parameter for the device; and
        modify the adjustable reliability feature for the partition based on the change in the operating parameter of the device, wherein the apparatus is in a housing of a device, the device being a self-contained electronic device.

2. The apparatus of claim 1, wherein the operating parameter subject to the change includes power availability.

3. The apparatus of claim 1, wherein the operating parameter subject to the change includes temperature.

4. A method for power-based adaptive hardware reliability on a device, the method comprising:
    dividing a hardware platform of the device into multiple partitions, a partition of the multiple partitions including a hardware component with an adjustable reliability feature, the partition placed into a reliability category of multiple reliability categories;
    obtaining a workload with a reliability requirement;
    executing the workload the partition based on the reliability category of the partition satisfying the reliability requirement of the workload;
    detecting a change in an operating parameter for the device; and
    modifying the adjustable reliability feature for the partition based on the change in the operating parameter of the device, wherein the device is a self-contained electronic device.

5. The method of claim 4, wherein the operating parameter subject to the change includes temperature.

6. At least one non-transitory machine readable medium including instructions that, when executed by processing circuitry of a device, cause the processing circuitry to perform operations comprising:
    dividing a hardware platform of the device into multiple partitions, a partition of the multiple partitions including a hardware component with an adjustable reliability feature, the partition placed into a reliability category of multiple reliability categories;
    obtaining a workload with a reliability requirement;
    executing the workload the partition based on the reliability category of the partition satisfying the reliability requirement of the workload;
    detecting a change in an operating parameter for the device; and
    modifying the adjustable reliability feature for the partition based on the change in the operating parameter of the device, wherein the device is a self-contained electronic device.

7. The at least one non-transitory machine readable medium of claim 6, wherein the operating parameter subject to the change includes power availability.

8. The at least one non-transitory machine readable medium of claim 7, wherein the change is a current reduction of power availability.

9. The at least one non-transitory machine readable medium of claim 7, wherein the change is a predicted reduction in power availability.

10. The at least one non-transitory machine readable medium of claim 9, wherein the predicted reduction in power availability is based on historical power supply and a current context.

11. The at least one non-transitory machine readable medium of claim 10, wherein the current context includes at least one of time or weather.

12. The at least one non-transitory machine readable medium of claim 8, wherein modifying the adjustable reliability feature includes reducing power consumption by disabling or reducing an intervention rate of the adjustable reliability feature.

13. The at least one non-transitory machine readable medium of claim 12, wherein the adjustable reliability feature is a memory refresh rate or patrol scrubbing operation.

14. The at least one non-transitory machine readable medium of claim 6, wherein the operating parameter subject to the change includes temperature.

15. The at least one non-transitory machine readable medium of claim 14, wherein the change is an increase in temperature.

16. The at least one non-transitory machine readable medium of claim 15, wherein modifying the adjustable reliability feature includes increasing reliability by enabling or increasing an intervention rate of the adjustable reliability feature.

17. The at least one non-transitory machine readable medium of claim 16, wherein the adjustable reliability feature is a memory refresh rate or patrol scrubbing operation.

18. The at least one non-transitory machine readable medium of claim 14, wherein the change is a predicted increase in temperature.

19. The at least one non-transitory machine readable medium of claim 18, wherein the predicted increase in temperature is based on historical temperature measurements and a current context.

20. The at least one non-transitory machine readable medium of claim 19, wherein the current context includes at least one of time or weather.

21. The at least one non-transitory machine readable medium of claim 6, wherein the operations comprise:
    moving the partition to a second reliability category in response to modifying the adjustable reliability feature; and
    moving the workload to a second partition that has the reliability category.

22. The at least one non-transitory machine readable medium of claim 6, wherein detecting the change in operating parameters for the device includes:
    monitoring errors during execution of the workload; and
    determining that the errors are beyond a threshold for the reliability category.

23. The at least one non-transitory machine readable medium of claim 6, wherein the reliability requirement is obtained by profiling the workload.

24. The at least one non-transitory machine readable medium of claim 6, wherein the reliability requirement is obtained by metadata distributed with the workload.

* * * * *